US012230891B2

(12) United States Patent
Tang et al.

(10) Patent No.: US 12,230,891 B2
(45) Date of Patent: Feb. 18, 2025

(54) PHASE SHIFTER ASSEMBLY FOR POLYMER-BASED DIPOLE RADIATING ELEMENTS

(71) Applicant: Outdoor Wireless Networks LLC, Claremont, NC (US)

(72) Inventors: Chengcheng Tang, Murphy, TX (US); Peter J. Bisiules, LaGrange Park, IL (US)

(73) Assignee: Outdoor Wireless Networks, LLC, Claremont, NC (US)

( * ) Notice: Subject to any disclaimer, the term of this patent is extended or adjusted under 35 U.S.C. 154(b) by 423 days.

(21) Appl. No.: 17/906,180

(22) PCT Filed: Apr. 6, 2021

(86) PCT No.: PCT/US2021/025856

§ 371 (c)(1),
(2) Date: Sep. 12, 2022

(87) PCT Pub. No.: WO2021/252059

PCT Pub. Date: Dec. 16, 2021

(65) Prior Publication Data

US 2023/0110891 A1 Apr. 13, 2023

Related U.S. Application Data

(60) Provisional application No. 63/037,851, filed on Jun. 11, 2020.

(51) Int. Cl.
*H01Q 3/36* (2006.01)
*H01Q 1/24* (2006.01)
(Continued)

(52) U.S. Cl.
CPC ............... *H01Q 3/36* (2013.01); *H01Q 1/246* (2013.01); *H01Q 9/28* (2013.01); *H01Q 15/14* (2013.01); *H01Q 21/26* (2013.01)

(58) Field of Classification Search
CPC ........... H01Q 3/36; H01Q 1/246; H01Q 9/28; H01Q 15/14; H01Q 21/26; H01Q 3/26; H01Q 21/24
See application file for complete search history.

(56) References Cited

U.S. PATENT DOCUMENTS 7,907,096 B2 3/2011 Timofeev et al.
11,791,542 B2 * 10/2023 Rieder .................. G01S 13/931 343/713

(Continued)

FOREIGN PATENT DOCUMENTS

WO 2017218396 A1 12/2017
WO 2020010039 A1 1/2020

OTHER PUBLICATIONS

Notification of Transmittal of the International Search Report and the Written Opinion of the International Searching Authority, or the Declaration, in corresponding PCT Application No. PCT/US2021/025856 (Jul. 27, 2021).

*Primary Examiner* — Wilson Lee
(74) *Attorney, Agent, or Firm* — Myers Bigel, P.A.

(57) ABSTRACT

An antenna assembly includes a backplane and a polymer substrate mounted over the backplane to define an air gap there-between. The polymer substrate supports radiating elements comprising a polymer-based waveguide feed stalk and a polymer-based pair of radiating arms supported by and electrically coupled to the waveguide feed stalk. A conductive layer is formed on the polymer substrate such that the conductive layer faces the backplane. A phase shifter including a movable element such as a dielectric member or trombone member may be positioned in the air gap for adjusting the phase of a radiating element or a phase shifter assembly may be positioned to the back side of the back plane.

20 Claims, 17 Drawing Sheets

(51) Int. Cl.

| | |
|---|---|
| ***H01Q 9/28*** | (2006.01) |
| ***H01Q 15/14*** | (2006.01) |
| ***H01Q 21/26*** | (2006.01) |

(56) References Cited

U.S. PATENT DOCUMENTS

| | | | | |
|---|---|---|---|---|
| 2005/0184827 | A1* | 8/2005 | Pallone .................. | H01Q 1/246 333/161 |
| 2016/0248170 | A1 | 8/2016 | Bisiules et al. | |
| 2018/0323513 | A1* | 11/2018 | Varnoosfaderani .......................... | H01Q 21/062 |
| 2019/0319367 | A1* | 10/2019 | Edwards .............. | H01Q 21/061 |
| 2021/0021019 | A1 | 1/2021 | Hou et al. | |
| 2021/0376489 | A1* | 12/2021 | Hiramatsu ........... | H01Q 9/0421 |
| 2022/0190476 | A1* | 6/2022 | Lenive ................. | H01Q 15/147 |

* cited by examiner

PHASE SHIFTER ASSEMBLY FOR POLYMER-BASED DIPOLE RADIATING ELEMENTS

CROSS-REFERENCE TO RELATED APPLICATION

The present application is a 35 U.S.C. § 371 national stage application of PCT Application No. PCT/US2021/025856, filed Apr. 6, 2021, which claims priority under 35 U.S.C. § 119 to U.S. Provisional Application Ser. No. 63/037,851, filed Jun. 11, 2020, the entire contents of which are incorporated herein by reference. The above-referenced PCT Application was published in the English language as International Publication No. WO 2021/252059 A1 on Dec. 16, 2021.

FIELD OF THE INVENTION

The present invention relates to radio communications and, more particularly, to phase shifter assemblies for base station antennas used in cellular communication systems.

BACKGROUND

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. In many cases, each base station is divided into "sectors." In perhaps the most common configuration, a hexagonally shaped-cell is divided into three 120° sectors, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements In order to accommodate the ever-increasing volume of cellular communications, cellular operators have added cellular service in a variety of new frequency bands. Cellular operators have applied a variety of approaches to support service in these new frequency bands, including deploying linear arrays of "wide-band" radiating elements that provide service in multiple frequency bands, and deploying multi-band base station antennas that include multiple linear arrays (or planar arrays) of radiating elements that support service in different frequency bands. These linear arrays are mounted in a side-by-side fashion.

Base station antennas are directional devices that can concentrate the RF energy that is transmitted in certain directions (or received from those directions). The "gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area such as the cell or a sector. The base station antenna may be designed to have minimum gain levels throughout its pre-defined coverage area, and it is typically desirable that the base station antenna have much lower gain levels outside of the coverage area to reduce interference between sectors/cells. Early base station antennas typically had a fixed radiation pattern, meaning that once a base station antenna was installed, its radiation pattern could not be changed unless a technician physically reconfigured the antenna. Such manual reconfiguration of base station antennas after deployment, which could become necessary due to changed environmental conditions or the installation of additional base stations, was typically difficult, expensive and time-consuming.

Most modern base station antennas have radiation patterns that can be reconfigured from a remote location by transmitting control signals to the antenna that electronically alter the RF signals that are transmitted and received by the antenna. Base station antennas having such capabilities are typically referred to as remote electronic tilt ("RET") antennas. The most common changes to the radiation pattern are changes in the down tilt angle (i.e., the elevation angle). By adjusting the elevation angles of the base station antennas of a particular base station, a wireless network operator can effectively change the size of the cell.

Base station antennas typically comprise one or more linear arrays or two-dimensional arrays of radiating elements such as patch, dipole or crossed dipole radiating elements. In order to electronically change the down tilt angle of one of these arrays, a phase taper may be applied the sub-components of an RF signal that are passed to the radiating elements of the array, as is well understood by those of skill in the art. Such a phase taper may be applied by adjusting the settings on an adjustable phase shifter that is positioned along the RF transmission path between a radio and the individual radiating elements of the base station antenna.

DETAILED DESCRIPTION OF EMBODIMENTS

Figure 1B:
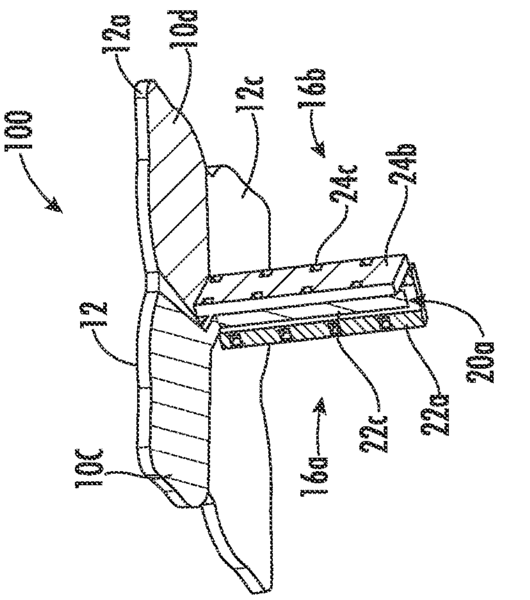
FIG. 1B is a perspective view of a rear side of the polymer-based cross-dipole radiating element of FIG. 1A, according to an embodiment of the invention.
Figure 1A:
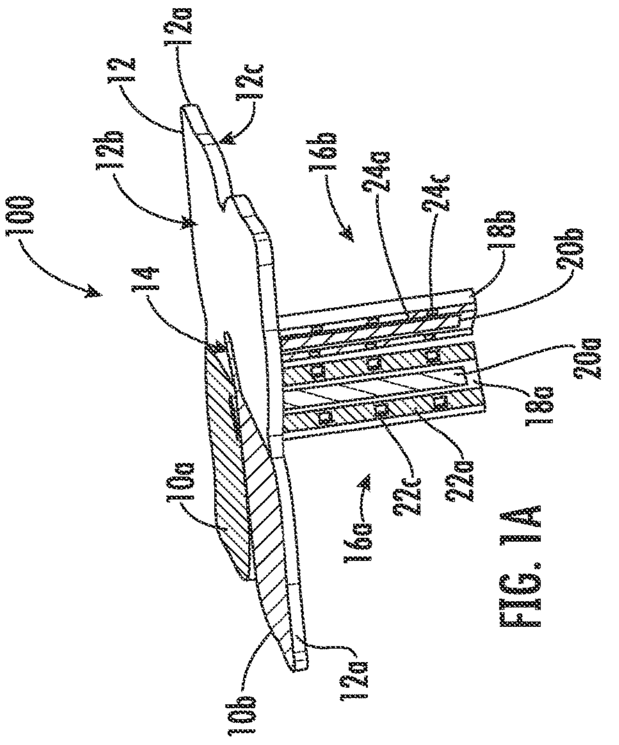
FIG. 1A is a side perspective view of a polymer-based cross-dipole radiating element according to an embodiment of the invention.
Figure 1C:
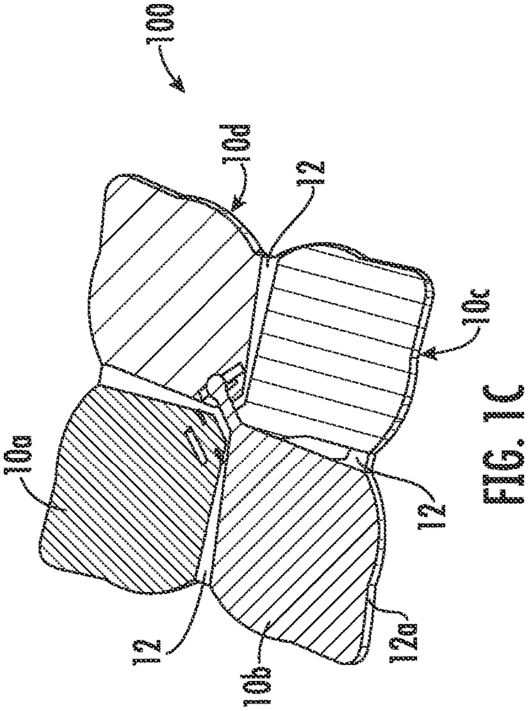
FIG. 1C is an elevated perspective view of the polymer-based cross-dipole radiating element of FIGS. 1A-1B, according to an embodiment of the invention.
Figure 1D:
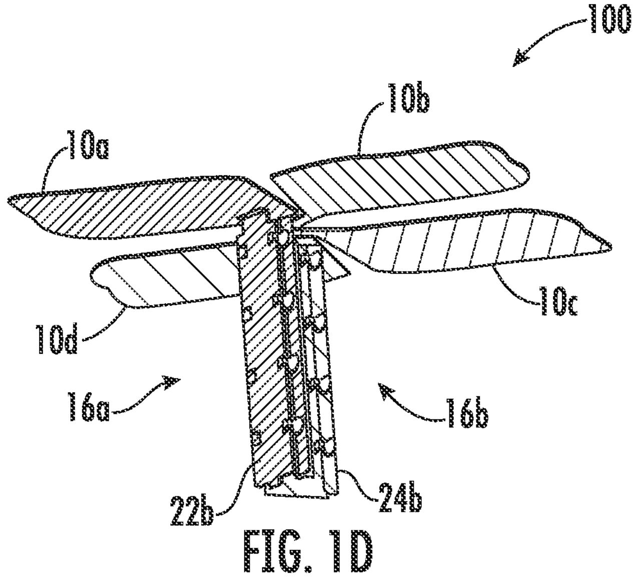
FIG. 1D is a perspective view of a rear side of the polymer-based cross-dipole radiating element of FIG. 1A, but with polymer backing removed to further highlight the arrangement of four distinct metallization patterns associated with two pairs of "cross-polarized" radiating arms.
Figure 1E:
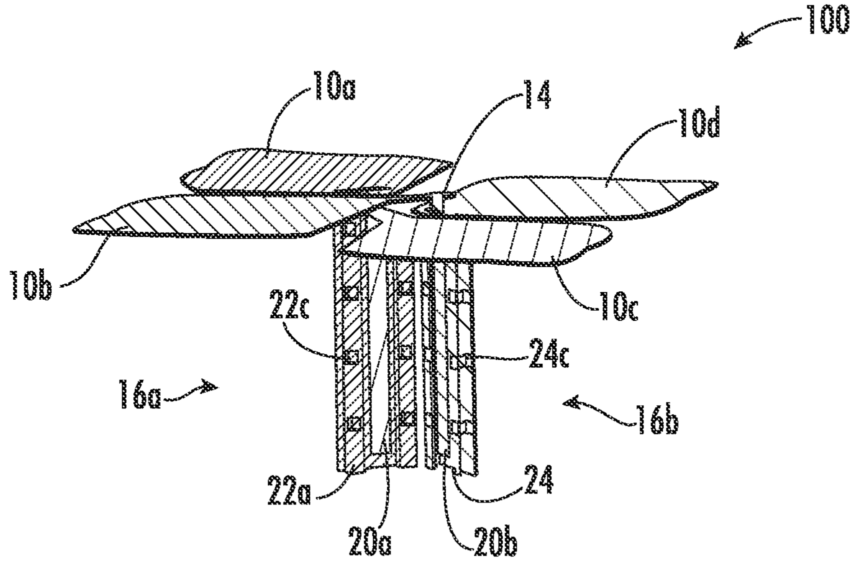
FIG. 1E is a perspective view of a side of the polymer-based cross-dipole radiating element of FIG. 1A, but with polymer backing removed to further highlight the arrangement of four distinct metallization patterns associated with two pairs of radiating arms.
Figure 2B:
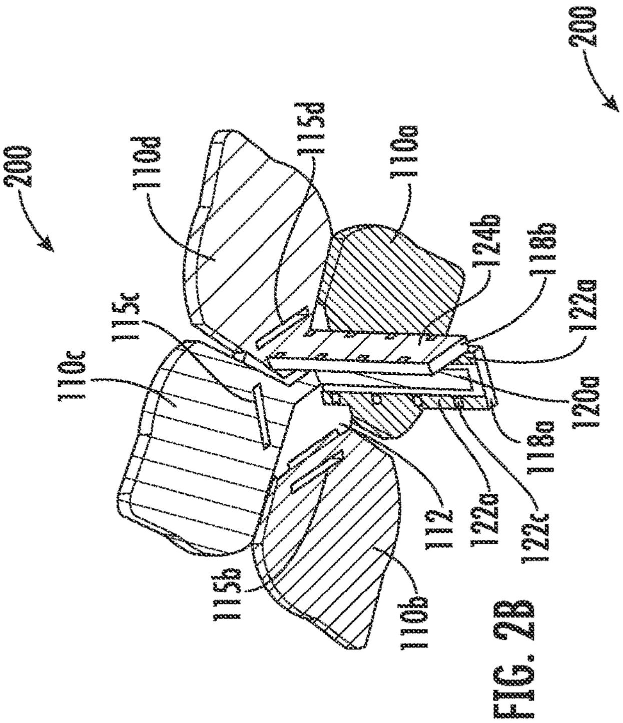
FIG. 2B is a second perspective view of a rear side of a polymer-based radiating element containing a quad-arrangement of double-sided metallized radiating arms with GCPW feed stalks, according to an embodiment of the invention.
Figure 2D:
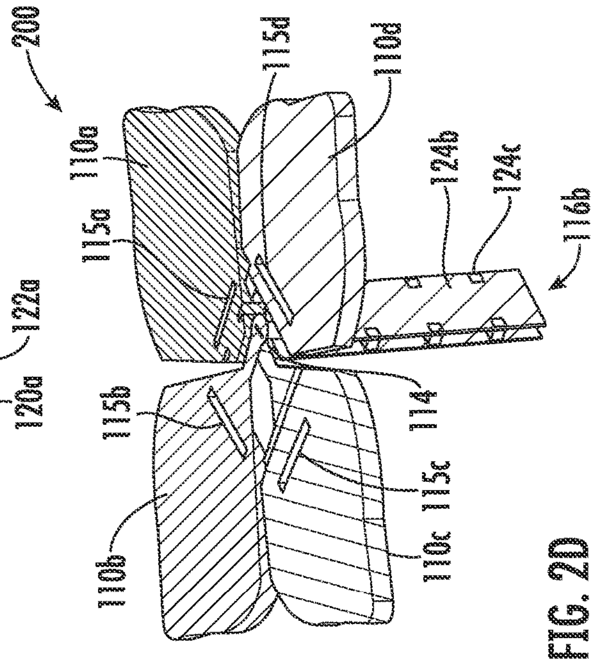
FIG. 2D is a side perspective view of the polymer-based radiating element of FIGS. 2A-2C, but with polymer backing removed to highlight metallized interconnections between the quad-arrangement of radiating arms and underlying feed stalks, according to an embodiment of the invention.
Figure 2A:
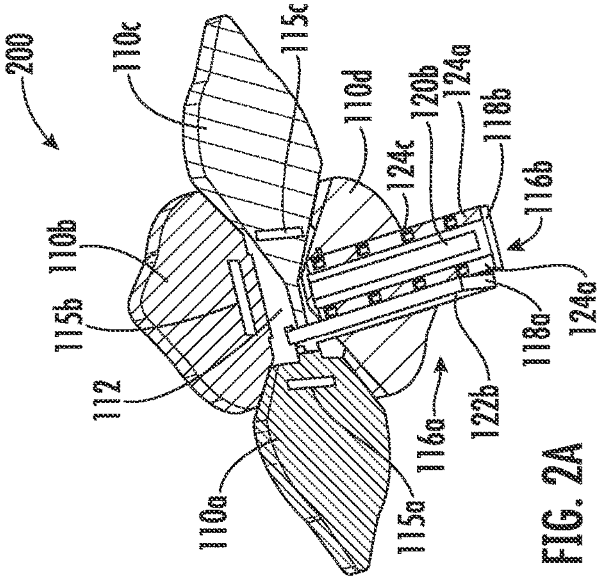
FIG. 2A is a first perspective view of a rear side of a polymer-based radiating element containing a quad-arrangement of double-sided metallized radiating arms with grounded coplanar waveguide (GCPW) feed stalks, according to an embodiment of the invention.
Figure 2C:
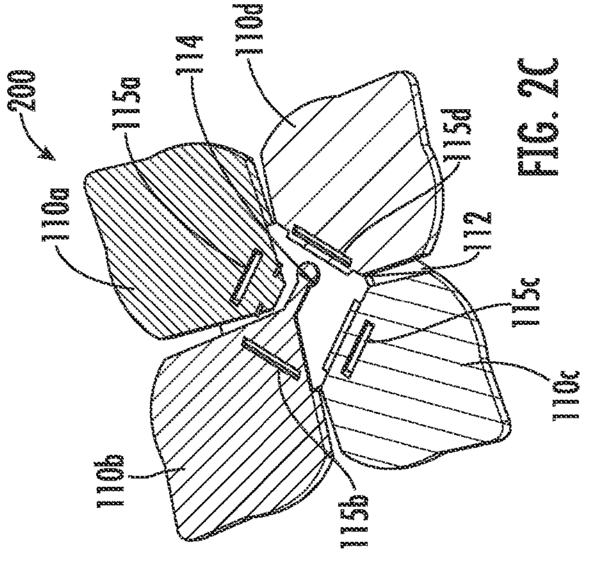
FIG. 2C is an elevated perspective view of the polymer-based radiating element of FIGS. 2A-2B, according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to FIGS. 1A-1E, a radiating element 100 according to an embodiment of the invention is illustrated as including a pair of polymer-based coplanar waveguide feed stalks 16*a*, 16*b*, and first and second pairs of polymer-based radiating arms, which define a cross-polarized radiating element 100 that is supported by and electrically coupled to the coplanar waveguide feed stalks 16*a*, 16*b*. As shown, the first and second pairs of polymer-based radiating arms may be configured from patterned metallization on front and rear facing surfaces of a generally four-sided polymer "arm" substrate 12 (with sidewall 12*a*). In particular, the first pair of radiating arms associated with a first dipole radiating element may include first and second metallization patterns 10*a*, 10*c* on respective front and rear facing surfaces 12*b*, 12*c* of the polymer substrate 12. Likewise, the second pair of radiating arms associated with a second dipole radiating element may include third and fourth metallization patterns 10*b*, 10*d* on respective front and rear facing surfaces 12*b*, 12*c* of the polymer substrate 12, as shown.

As best shown by FIGS. 1A-1B and 1D-1E, the pair of polymer-based coplanar waveguide feed stalks includes a first feed stalk 16*a* and a second feed stalk 16*b*, which may be spaced-apart from the first feed stalk 16*a* and orientated at a right angle relative to the first feed stalk 16*a*. This first feed stalk 16*a* includes a polymer feed stalk substrate 18*a*, a first feed conductor 20*a* on a first surface of the feed stalk substrate 18*a*, and a ground plane 22*b*, which may fully cover a second opposed surface of the feed stalk substrate 18*a*. This ground plane 22*b* is also electrically connected to a first pair of ground plane conductors 22*a* via a plurality of plated through-holes 22*c* (or other conductive structures) in the feed stalk substrate 18*a*. As illustrated, this first pair of ground plane conductors 22*a* extend on opposite sides of the first feed conductor 20*a*, so that the first feed stalk 16*a* (with ground plane 22*b*) operates as a "finite" ground-plane coplanar waveguide (GCPW) feed stalk 16*a*. Moreover, as shown best by FIGS. 1B and 1E, the first feed conductor 20*a* extends the full vertical length of the first feed stalk 16*a* and continues uninterrupted onto the rear facing surface of the polymer arm substrate 12 and into the second metallization "arm" pattern 10*c*, to thereby suppress passive intermodulation (PIM-type) interconnect distortion.

Similarly, the second feed stalk 16*b* includes a polymer feed stalk substrate 18*b*, a second feed conductor 20*b* on a first surface of the feed stalk substrate 18*b*, and a ground plane 24*b* which may fully cover a second opposed surface of the feed stalk substrate 18*b*. This ground plane 24*b* is also electrically connected to a second pair of ground plane conductors 24*a*, via, for example, a plurality of plated through-holes 24*c* in the feed stalk substrate 18*b*. As illustrated, this second pair of ground plane conductors 24*a* extend on opposite sides of the second feed conductor 20*b*, so that the second feed stalk 16*b* (with ground plane 24*b*) operates as a GCPW feed stalk 16*b*. In addition, as shown best by FIGS. 1A, 1C and 1E, the second feed conductor 20*b* extends the full vertical length of the second feed stalk 16*b* and continues uninterrupted (via a plated through-hole and metal extension 14) onto the front facing surface of the polymer arm substrate 12 and into the third metallization "arm" pattern 10*b*.

Referring now to FIGS. 2A-2D, a radiating element 200 according to another embodiment of the invention is illustrated as including a pair of polymer-based coplanar waveguide feed stalks 116*a*, 116*b*, and first and second pairs of polymer-based and double-sided radiating arms, which define a cross-polarized radiating element 200 that is supported by and electrically coupled to the coplanar waveguide feed stalks 116*a*, 116*b*. As shown, the first and second pairs of polymer-based radiating arms may be configured by selectively patterning double-sided metallization on front and rear facing surfaces of a generally four-sided polymer "arm" substrate 112, to thereby support the use of somewhat smaller substrates 112 relative to the embodiment of FIGS. 1A-1E. In particular, the first pair of radiating arms associated with a first dipole radiating element may include first and second double-sided metallization patterns 110*a*, 110*c* on both front and rear facing surfaces of the polymer substrate 112. Likewise, the second pair of radiating arms associated with a second "orthogonal" dipole radiating element may include third and fourth double-sided metallization patterns 110*b*, 110*d* on both front and rear facing surfaces of the polymer substrate 112, as shown. And, the fabrication of these double-sided metallization patterns 110*a*-110*d* may be facilitated by the use of slots 115*a*-115*d* (e.g., rectangular slots) within the polymer substrate 112, which are sufficiently large to support the formation of high conductivity electrical paths (with low PIM) between the front and rear facing surfaces of the polymer substrate 112 and feed stalks 116*a*, 116*b*, during selective metallization.

The pair of polymer-based coplanar waveguide feed stalks includes a first feed stalk 116*a* and a second feed stalk 116*b*, which may be spaced-apart from the first feed stalk 116*a* and orientated at a right angle relative to the first feed stalk 116*a*. This first feed stalk 116*a* includes a polymer feed stalk substrate 118*a*, a first feed conductor 120*a* on a first surface of the feed stalk substrate 118*a*, and a ground plane 122*b*, which may fully cover a second surface of the feed stalk substrate 118*a*. This ground plane 122*b* is electrically connected to a first pair of ground plane conductors 122*a*, via, for example, a plurality of plated through-holes 122*c* in the feed stalk substrate 118*a*. This first pair of ground plane conductors 122*a* extend on opposite sides of the first feed conductor 120*a*, so that the first feed stalk 116*a* (with ground plane 122*b*) operates as a "finite" ground-plane coplanar waveguide (GCPW) feed stalk 116*a*. In addition, as shown best by FIG. 2B, the first feed conductor 120*a* extends the full vertical length of the first feed stalk 116*a* and continues uninterrupted onto the rear facing surface of the second metallization "arm" pattern 110*c* and onto the front facing surface of the second metallization "arm" pattern 110*c* via the rectangular slot 115*c*.

Likewise, the second feed stalk 116*b* includes a polymer feed stalk substrate 118*b*, a second feed conductor 120*b* on a first surface of the feed stalk substrate 118*b*, and a ground plane 124*b*, which may fully cover a second surface of the feed stalk substrate 118*b*. This ground plane 124*b* is electrically connected to a second pair of ground plane conductors 124*a*, via a plurality of plated through-holes 124*c* in the feed stalk substrate 118*b*. As illustrated, this second pair of ground plane conductors 124*a* extend on opposite sides of the second feed conductor 120*b*, so that the second feed stalk 116*b* (with ground plane 124*b*) operates as a GCPW feed stalk 116*b*. In addition, as shown best by FIGS. 2A and 2D, the second feed conductor 120*b* extends the full vertical length of the second feed stalk 116*b* and continues uninterrupted (via a plated through-hole and metal extension 114) onto the front facing surfaces of the polymer substrate 112 and onto the front and rear facing surfaces of the third metallization "arm" pattern 110*b*.

Figure 3A:
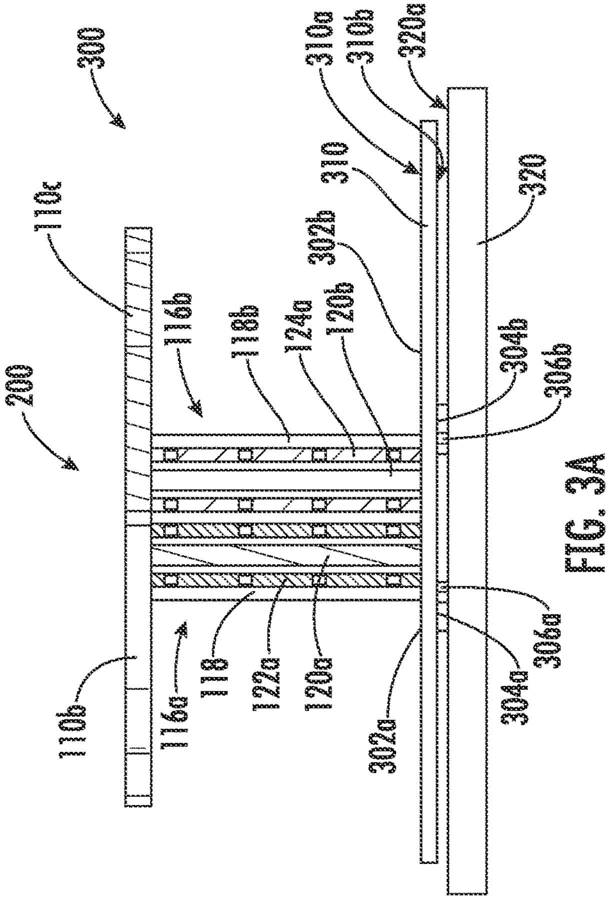
FIG. 3A is a side view of a polymer-based radiating element containing a quad-arrangement of double-sided metallized radiating arms with grounded coplanar waveguide (GCPW) feed stalks and polymer base, on an electrically conductive reflector, according to an embodiment of the invention.
Figure 3C:
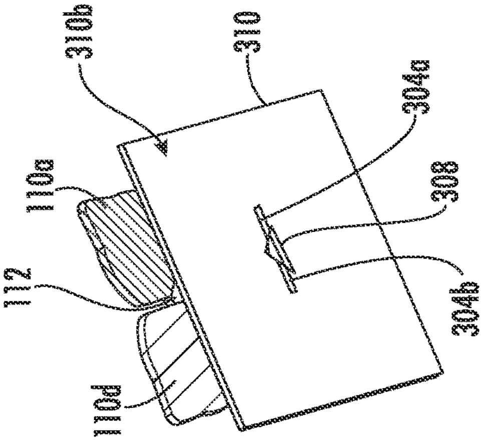
FIG. 3C is a perspective view of a rear side of the polymer-based radiating element of FIGS. 3A-3B, according to an embodiment of the invention.
Figure 3B:
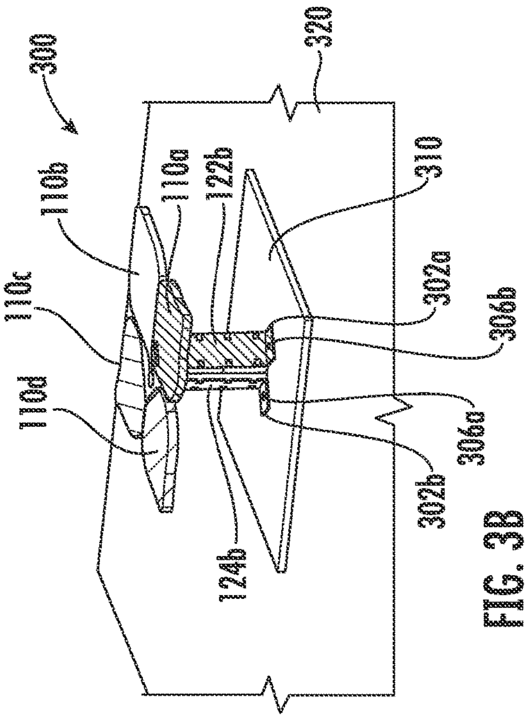
FIG. 3B is an elevated perspective view of the polymer-based radiating element and reflector of FIG. 3A, according to an embodiment of the invention.

Referring now to FIGS. 3A-3C, a polymer-based radiating element 300 according to a further embodiment of the invention is illustrated as including a quad-arrangement of double-sided metallized radiating arms with grounded coplanar waveguide (GCPW) feed stalks, as shown by the radiating element 200 of FIGS. 2A-2D, along with a polymer base 310 and an underlying electrically conductive "ground plane" reflector 320. Advantageously, in some embodiments of the invention, the radiating element 200 of FIGS. 2A-2B, including substrate 112 and feed stalks 116*a*, 116*b*, may be integrated with the polymer base 310 as a one-piece unitary polymer-based structure. For example, the radiating element 300 may be formed as a unitary three-dimensional (3D) structure using injection molding fabrication techniques, with polymers such as polyphenylene sulfide (PPS), including glass-fiber reinforced PPS (e.g., PPS GF-40), and liquid crystal polymers. Accordingly, the radiating elements of the embodiments described herein need not be manufactured from independently formed and assembled printed circuit board components (e.g., PCB-based base, feed stalk and arm components). Moreover, these injection molding fabrication techniques may support the formation of a unitary structure having somewhat rounded edges and corners, which support low PIM-type distortion when metallized.

Upon fabrication as a one-piece three-dimensional polymer structure, a surface roughening process may be performed on the unitary polymer structure to facilitate material adhesion. Thereafter, a metal adhesion layer may be deposited onto the entirety of the polymer structure and then selectively removed (e.g., with laser etching) to thereby define a plurality of metal adhesion regions (not shown). These regions can then be "selectively" metallized (e.g., using copper (Cu) and tin (Sn dipping) to thereby define the various functional metal regions described herein. The radiating elements 100 and 200 discussed above may be formed in the same or similar manner.

Furthermore, as shown by FIG. 3A, the polymer base 310 may be at least partially mechanically and electrically secured to the underlying reflector 320 using, for example, a pair of electrically conductive self-clinch fasteners (SCFs), which may be configured as phosphor bronze pins 306*a*, 306*b*, for example. These pins, 306*a*, 306*b*, which may be fixedly attached to the front surface 320*a* of the reflector 320, may be inserted through the polymer base 310 and received within respective metallized ground tabs 302*a*, 302*b*, which are patterned onto a forward surface 310*a* of the base 310. As shown best by FIG. 3B, these ground tabs 302*a*, 302*b* may be provided as extensions of respective feed stalk ground planes 122*b*, 124*b*, so that direct electrical connections, with low passive intermodulation distortion (PIM), can be provided between the ground planes of the respective (GCPW) feed stalks 116*a*, 116*b* and the reflector 320.

In addition, as illustrated by FIGS. 3A and 3C, the metallization on the polymer base 310 may be patterned so that the first and second feed conductors 120*a*, 120*b* (on the first and second (GCPW) feed stalks 116*a*, 116*b*) are electrically connected to corresponding first and second feed lines 304*a*, 304*b*, which are patterned on a rear surface 310*b* of the polymer base 310 and within an opening 308 therein so that an uninterrupted metallization pattern can be provided between the rear surface 310*b* of the polymer base 310 and the first and second feed conductors 120*a*, 120*b* on the feed stalks 116*a*, 116*b*. Although not shown in FIG. 3C, these first and second feed lines 304*a*, 304*b* may be configured to receive a corresponding pair of RF input feed signals, which are provided by an external feed source(s).

Figure 4A:
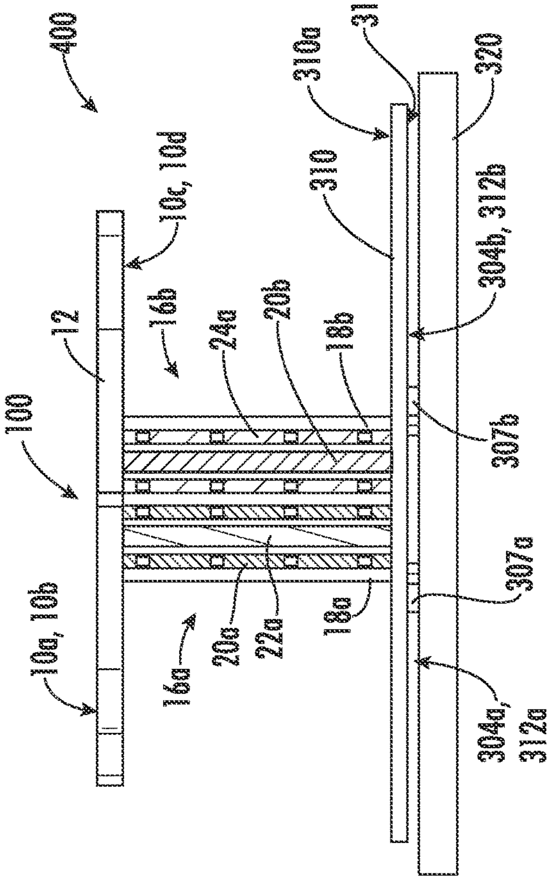
FIG. 4A is a side view of a polymer-based radiating element containing a quad-arrangement of single-sided metallized radiating arms with grounded coplanar waveguide (GCPW) feed stalks, polymer base and quarter-wavelength (λ/4) open circuit stub, on an electrically conductive reflector, according to an embodiment of the invention.
Figure 4B:
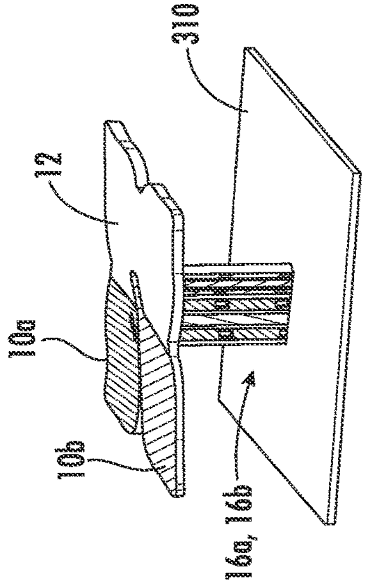
FIG. 4B is an elevated perspective view of the polymer-based radiating element of FIG. 4A, according to an embodiment of the invention.
Figure 4C:
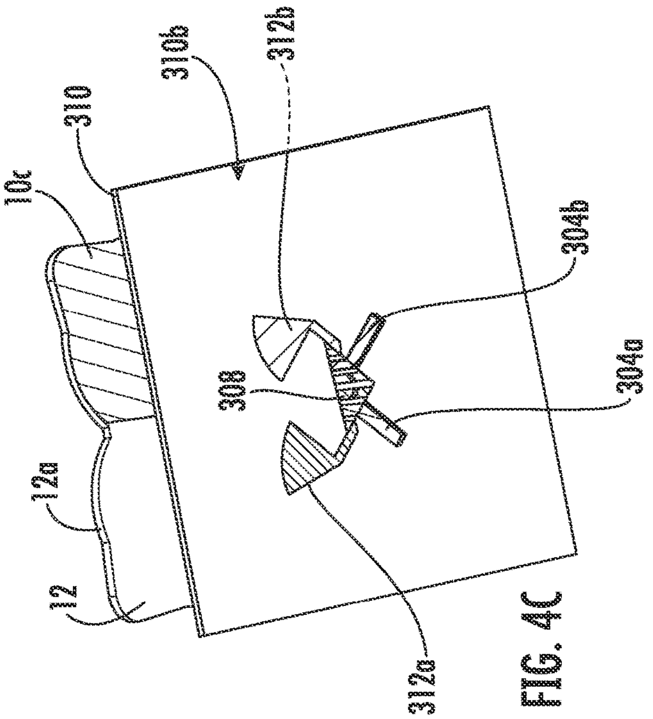
FIG. 4C is a perspective view of a rear side of the polymer-based radiating element of FIGS. 4A-4B, according to an embodiment of the invention.

Referring now to FIGS. 4A-4C, a polymer-based radiating element 400 according to a further embodiment of the invention is illustrated as including: (i) the cross-polarized radiating element 100 of FIGS. 1A-1E, (ii) a polymer base 310, which forms a unitary structure with the radiating element 100, as described hereinabove with respect to FIGS. 3A-3C, and (iii) an underlying electrically conductive reflector 320. As illustrated by FIG. 4A, this polymer base 310 includes a plurality of polymer support posts 307*a*, 307*b*, which space the base 310 at a desired distance from the reflector 320. The base 310 is also formed to have a through opening 308 therein, which extends between its front and rear facing surfaces 310*a*, 310*b*. The polymer base 310 may be selectively metallized so that the first and second feed conductors 20*a*, 20*b* (on the first and second (GCPW) feed stalks 16*a*, 16*b*) are electrically connected to corresponding first and second feed lines 304*a*, 304*b*, which extend on a rear surface 310*b* of the polymer base 310, as air microstriplines, and within the opening 308 therein (so that an uninterrupted metallization pattern can be provided between the rear surface 310*b* of the polymer base 310 and the first and second feed conductors 20*a*, 20*b*).

However, in contrast to the radiating element 300 of FIGS. 3A-3C, there is no direct electrical connection (i.e., DC "short") provided between the ground planes (22*a-c*, 24*a-c*) of the respective (GCPW) feed stalks 16*a*, 16*b* and the underlying reflector 320. Instead, these ground planes 22*a-c*, 24*a-c* are directly connected to respective arc-shaped metallization patterns 312*a*, 312*b*, which are provided on the rear surface 310*b* of the polymer base 310, adjacent the opening 308, and capacitively coupled (across an air gap) to the reflector 320. Although not wishing to be bound by any theory, these arc-shaped metallization patterns 312*a*, 312*b* and connecting thin strip metallization operate, at high frequency, as a capacitively grounded open circuit (OC), which can be advantageously sized in length to correspond to a quarter wavelength (e.g., λ/4) of a desired operating frequency of the radiating element 400, which may be equivalent to a center frequency of a corresponding operating band. Stated alternatively, these arc-shaped λ/4 open-circuited patterns 312*a*, 312*b* operate as transmission lines that provide radio frequency (RF) short-circuits (i.e., RF grounding) for the feed stalks 16*a*, 16*b*, but without requiring a direct galvanic connection to the reflector 320, which is often unsolderable due to its material characteristics.

Figure 5A:
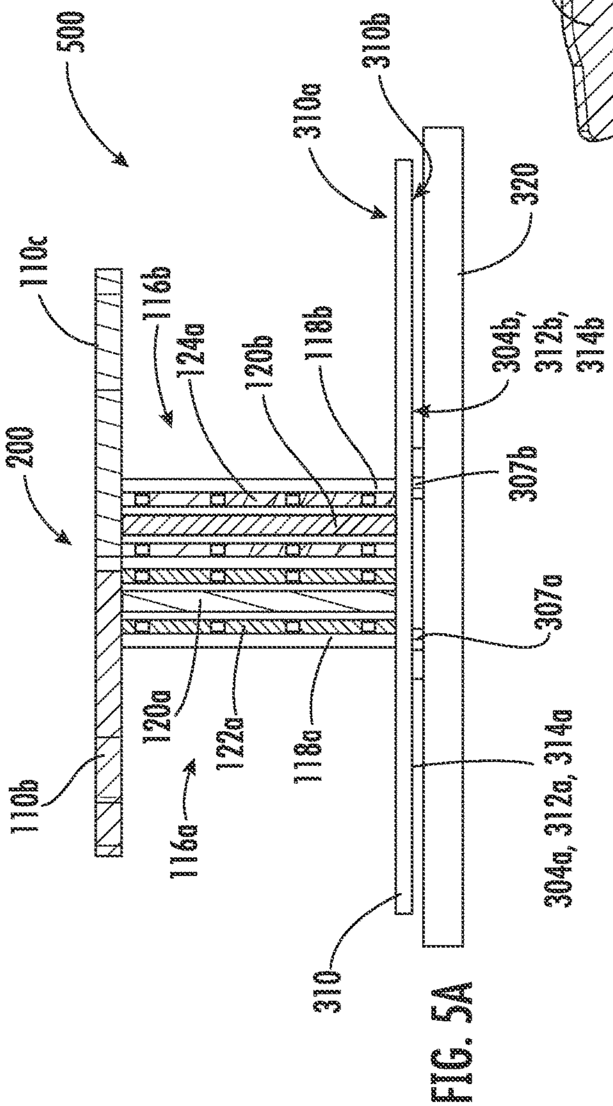
FIG. 5A is a side view of a polymer-based radiating element containing a quad-arrangement of double-sided metallized radiating arms with grounded coplanar waveguide (GCPW) feed stalks, polymer base and quarter-wavelength (λ/4) open circuit stubs, on an electrically conductive reflector, according to an embodiment of the invention.
Figure 5B:
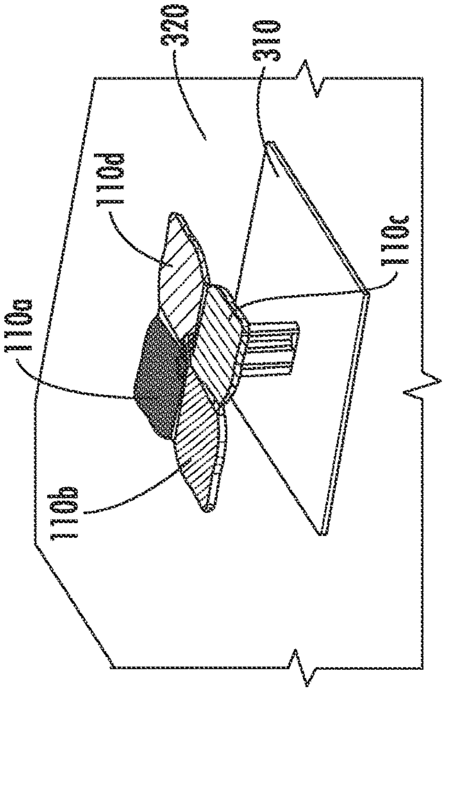
FIG. 5B is an elevated perspective view of the polymer-based radiating element and reflector of FIG. 5A, according to an embodiment of the invention.
Figure 5C:
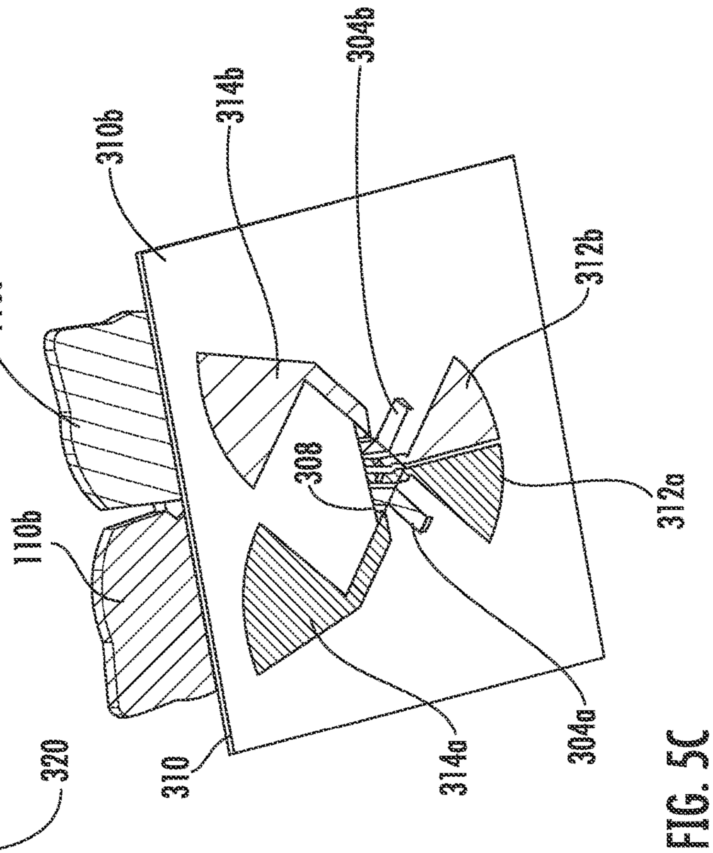
FIG. 5C is a perspective view of a rear side of the polymer-based radiating element of FIGS. 5A-5B, according to an embodiment of the invention.

Referring now to FIGS. 5A-5C, a polymer-based radiating element 500 according to a further embodiment of the invention is illustrated as including: (i) the cross-polarized radiating element 200 of FIGS. 3A-3C, (ii) a polymer base 310, which forms a unitary structure with the radiating element 200, and (iii) an underlying electrically conductive reflector 320. As illustrated by FIG. 5C, the polymer base 310 includes a plurality of polymer support posts 307*a*, 307*b*, which space the base 310 at a desired distance from the reflector 320. The base 310 is also formed to have a through opening 308 therein, which extends between its front and rear facing surfaces 310*a*, 310*b*. The polymer base 310 may be selectively metallized so that the first and second feed conductors 120*a*, 120*b* (on the first and second (GCPW) feed stalks 116*a*, 116*b*) are electrically connected to corresponding first and second feed lines 304*a*, 304*b*. As shown, these feed lines 304*a*, 304*b* extend on a rear surface 310*b* of the polymer base 310, as air microstriplines, and within the opening 308 therein, so that an uninterrupted metallization pattern can be provided between the rear surface 310*b* of the polymer base 310 and the first and second feed conductors 120*a*, 120*b*.

In addition, somewhat like the reflector 400 of FIGS. 4A-4C, the ground planes 122*a-c*, 124*a-c* associated with the first and second feed stalks 116*a*, 116*b* are directly connected to respective pairs of arc-shaped metallization patterns (312*a*, 314*a*) and (312*b*, 314*b*), which are capacitively coupled (across an air gap) to the reflector 320. Although not wishing to be bound by any theory, the first pair of unequally-sized arc-shaped metallization patterns (312*a*, 314*a*) and the second pair of unequally-sized arc-shaped metallization patterns (312*b*, 314*b*) operate, at high frequency and in parallel, as pairs of capacitively grounded open circuits (OC), which can be advantageously sized to correspond to: (i) a quarter wavelength (e.g., $\lambda_1/4$) of a first desired operating frequency (e.g., "low" frequency) within an operating band of the radiating element 500, and (ii) a quarter wavelength (e.g., $\lambda_2/4$) of a second desired operating frequency (e.g., higher frequency) within the operating band.

Figure 6A:
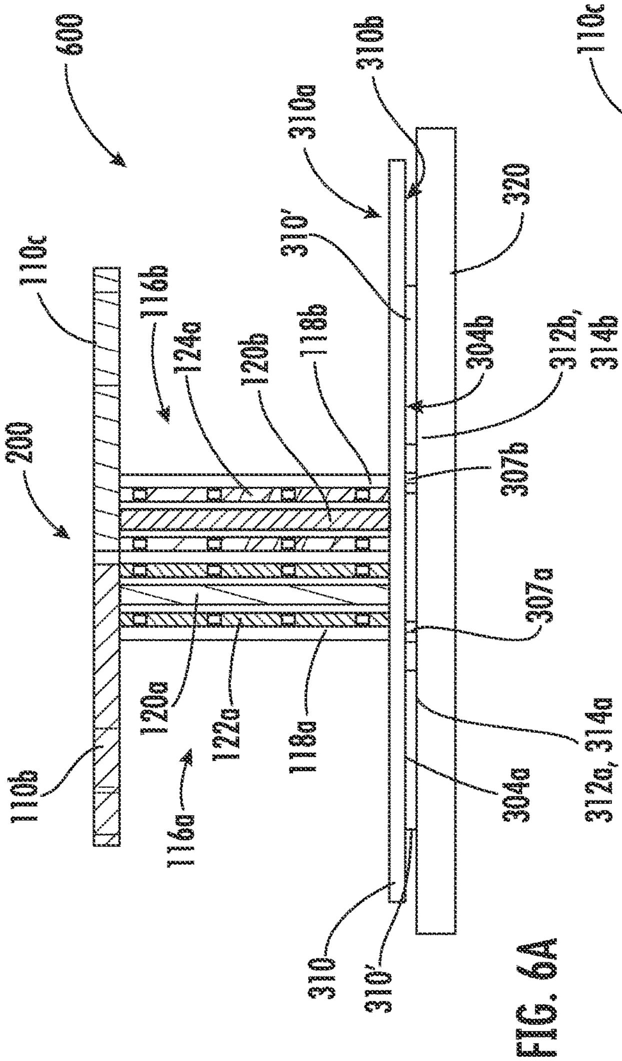
FIG. 6A is a side view of a polymer-based radiating element containing a quad-arrangement of double-sided metallized radiating arms with grounded coplanar waveguide (GCPW) feed stalks, polymer base and quarter-wavelength (λ/4) open circuit stubs, on an electrically conductive reflector, according to an embodiment of the invention.
Figure 6B:
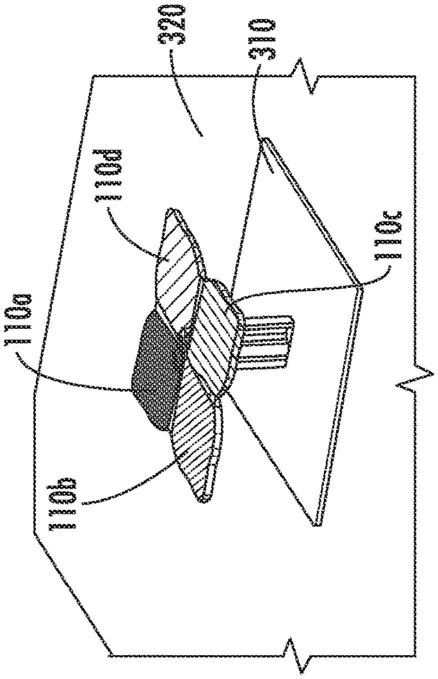
FIG. 6B is an elevated perspective view of the polymer-based radiating element and reflector of FIG. 6A, according to an embodiment of the invention.
Figure 6C:
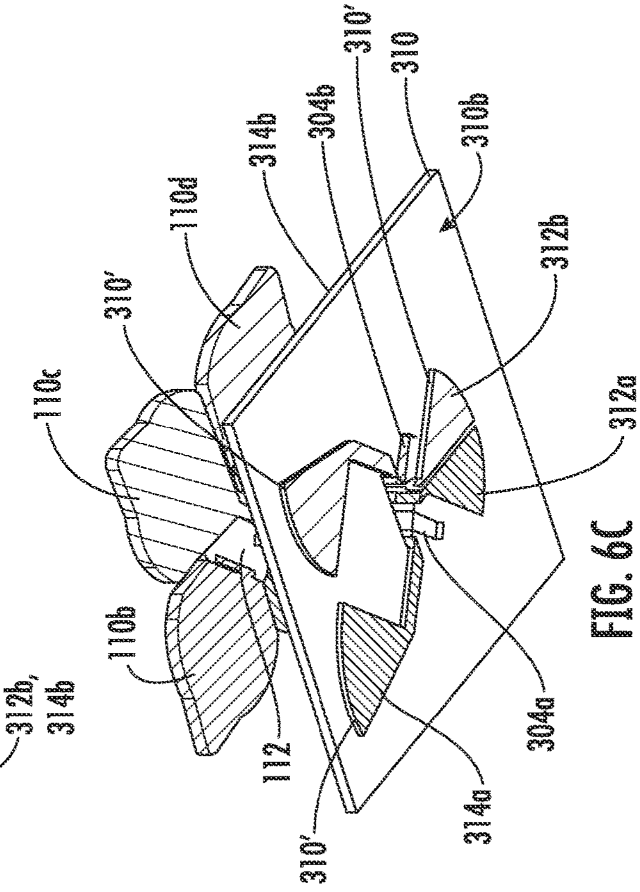
FIG. 6C is a perspective view of a rear side of the polymer-based radiating element of FIGS. 6A-6B, according to an embodiment of the invention.
Figure 6D:
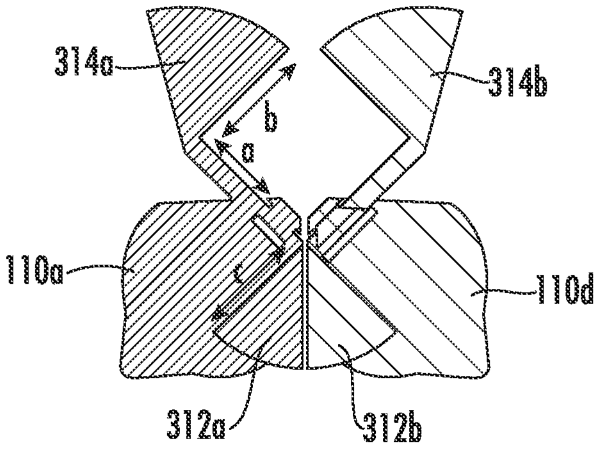
FIG. 6D is a schematic view of the two pairs of arc-shaped metallization patterns (312*a*, 314*a*) and (312*b*, 314*b*) illustrated by FIG. 6C, against a backdrop of the corresponding double-sided metallization patterns 110*a*, 110*d* of FIGS. 6A-6C, according to an embodiment of the invention.

The use of parallel-connected pairs of capacitively grounded open circuits, as described above with respect to FIGS. 5A-5C to support wider bandwidth performance (with better return loss (RL) and isolation (ISO)), may be further improved by adding raised polymer sectors 310' (e.g., 0.65 mm raised) to the rear facing surface 310*b* of the polymer base 310, as illustrated by the radiating element 600 of FIGS. 6A-6C, which is otherwise equivalent the radiating element 500. As shown by FIGS. 6A and 6C, the use of raised polymer sectors 310' underneath the pairs of arc-shaped metallization patterns (312*a*, 314*a*) and (312*b*, 314*b*), operate to more closely space, and capacitively couple, the arc-shaped metallization patterns to the front surface of the reflector 320, while still maintaining a sufficient gap between the reflector 320 and other portions of the rear-facing surface of the polymer base 310, including between the air microstriplines associated with feed lines 304*a*, 304*b* and the reflector 320. Moreover, as illustrated by the arc-shaped metallization patterns (312*a*, 314*a*) and (312*b*, 314*b*) of FIG. 6D, in order to provide a sufficiently wide overall RF radiating bandwidth, the sum of the orthogonal dimensions a+b associated with the larger arc-shaped patterns 314*a*, 314*b* should correspond to $\lambda/4$ (i.e., a quarter wavelength of a center frequency of a corresponding frequency band). However, if the frequency band is relatively large (e.g., 2.3 GHz to 4.2 GHz), then it may be helpful to treat the large band as being divided into two smaller sub-bands (e.g., 2.2 GHz to 2.7 GHz, and 3.3 GHz to 4.2 GHz), and provide a smaller pair of arc-shaped patterns 312*a*, 312*b*, with dimension "c"=$\lambda/4$ (where, c<a+b), to cover the higher frequency sub-band (i.e., 3.3 GHz to 4.2 GHz), while leaving the larger patterns 314*a*, 314*b* to cover the lower frequency sub-band (e.g., 2.2 GHz to 2.7 GHz).

Figure 7:
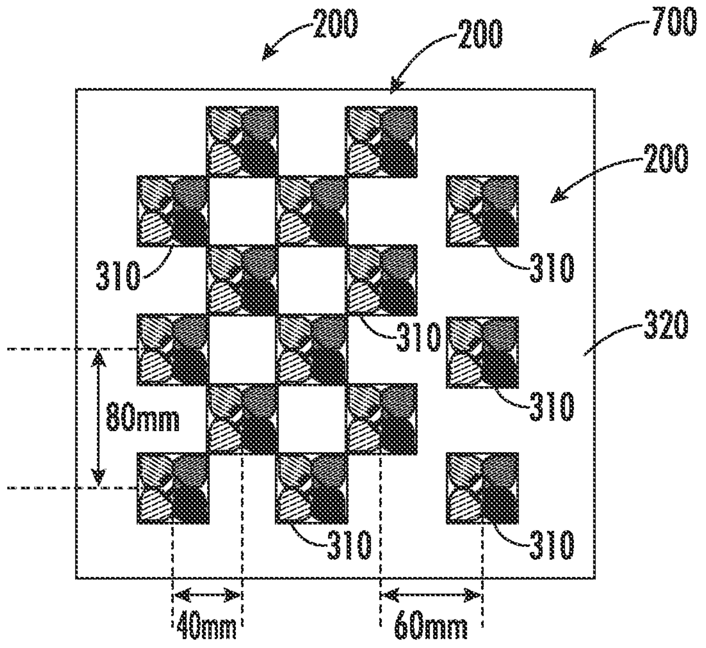
FIG. 7 is a plan view of a multi-band antenna (e.g., time-division duplexing (TDD) beamformer) having a two-dimensional array of the polymer-based radiating elements of FIGS. 6A-6D thereon, according to an embodiment of the invention.

Referring now to FIG. 7, a multi-band antenna 700 (e.g., time-division duplexing (TDD) beamformer), according to an embodiment of the invention, is illustrated as including a two-dimensional array of the unitary polymer-based radiating elements 200 of FIGS. 6A-6D (with polymer bases 310), on an underlying reflector 320. This array is illustrated as including six (6) rows and five (5) columns of radiating elements 200, with all rows and four of the five columns of radiating elements 200 being equally spaced at a row-to-row and column-to-column pitch of 40 mm. In addition, a fifth column of radiating elements 200, which spans only 3 of the 6 rows, is spaced at 60 mm (i.e., 1.5×40 mm) from the nearest fourth column of radiating elements 200, to thereby provide advantageous beam forming characteristics across a relatively wide frequency range. These advantageous beam forming characteristics are more fully described in the aforementioned and commonly assigned U.S. Provisional Application Ser. No. 62/883,279, filed Aug. 6, 2019, entitled "Base Station Antennas Having Multiband Beam-Former Arrays and Related Methods of Operation," the disclosure of which is hereby incorporated herein by reference.

Figure 8A:
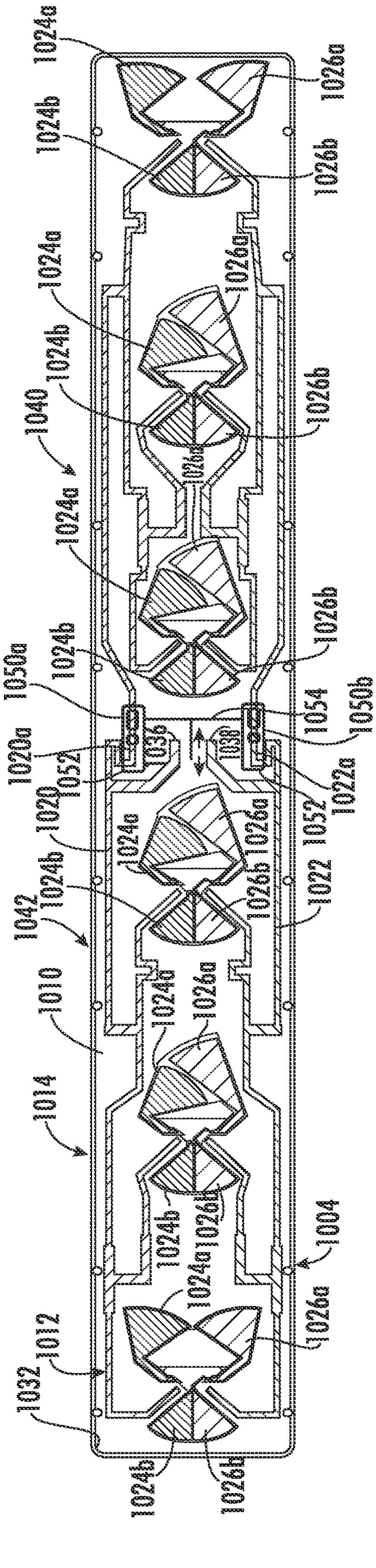
FIG. 8A is a rear view of another antenna assembly according to embodiments of the invention.
Figure 8B:
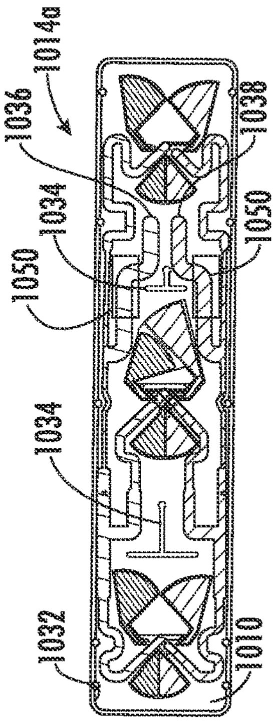
FIG. 8 is a rear view of an antenna assembly according to embodiments of the invention.
Figure 9:
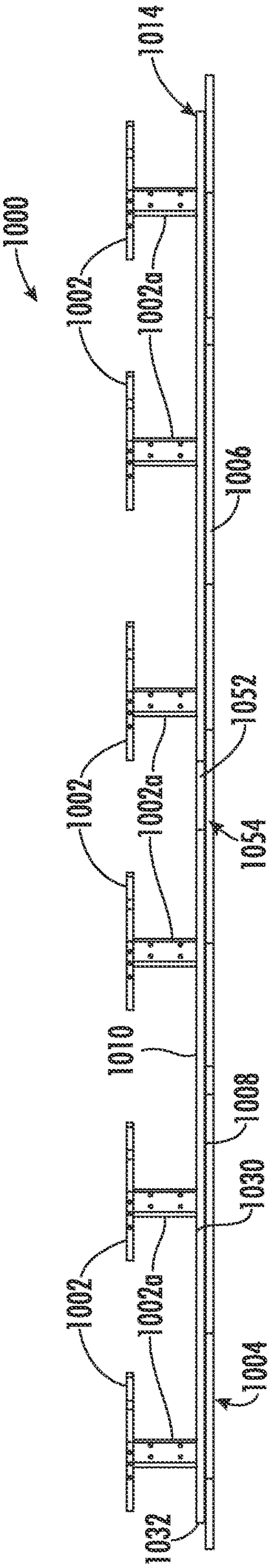
FIG. 9 is a side view of the antenna assembly of FIG. 8.

Referring to FIGS. 8 through 12, embodiments of an antenna assembly for that includes an array of radiating elements 1002 such as described above is shown. As shown in FIGS. 8 and 9 the antenna assembly 1000 comprises an air microstrip feed assembly 1004 including RF feeds for the radiating elements 1002 and phase shifters for adjusting the phase of the sub-components of the RF signals that are emitted by the radiating elements 1002. The feed assembly 1004 comprises a backplane 1006 made of aluminum or other suitable metal. The front surface 1008 of backplane 1006 forms a reflector. A unitary polymer substrate 1010 is mounted over the backplane 1006 in spaced relationship relative thereto. The polymer substrate 1010 includes a conductive layer 1012 formed on the rear surface thereof such that the conductive layer 1012 faces the front reflective surface 1008 of the backplane 1006. The polymer substrate 1010 and conductive layer 1012 may be considered a feed subassembly 1014.

As explained above, the feed subassembly 1014 may be made by performing a surface roughening process on the polymer substrate 1010 to facilitate material adhesion. Thereafter, a metal adhesion layer may be deposited onto the entirety of the polymer substrate 1010 and then selectively removed (e.g., with laser etching) to thereby define a plurality of metal adhesion regions (not shown) on the polymer substrate 1010. These regions can then be "selectively" metallized (e.g., using copper (Cu) and tin (Sn dipping) to thereby define the various functional metal regions described herein. The functional metal regions define the feed lines to the radiating elements 1002 mounted on the substrate 1010. In the embodiment of FIGS. 8 and 9, two feed lines are provided where the first feed line 1020 feeds RF signals having a first polarization to and from first polarization radiators of the cross dipole radiating elements 1002 and the second feed line 1022 feeds RF signals having a second polarization to and from second polarization radiators of the cross dipole radiating elements 1002. The specific configurations of the first feed line 1020 and the second feed line 1022 are for illustrative purposes only and the actual configurations of the first and second feed lines 1020, 1022 may be different than as specifically shown herein. The feed lines 1020 and 1022 may connect to pairs of arc-shaped metallization patterns (1024*a*, 1026*a*) and (1024*b*, 1026*b*) where the feed stalks 1002*a* of the radiating elements 1002 are connected to the arc-shaped metallization patterns 1024*a*, 1026*a*, 1024*b* and 1026*b* as previously described.

An air gap 1030 is formed between the backplane 1006 and the feed subassembly 1014. To maintain the spacing between the backplane 1006 and the feed subassembly 1014, spacer features may be molded into the polymer substrate 1010. For example, the polymer substrate 1010 may include a lip 1032 that extends rearwardly from the perimeter, or adjacent the perimeter, of the polymer substrate 1010. The lip 1032 engages a surface of the backplane 1006. The lip 1032 is dimensioned such that the lip 1032 spaces the feed lines 1020 and 1022 a desired distance from the backplane 1006 to maintain the thickness of the air gap 1030 between the first and second feed lines 1020, 1022 and the backplane 1006. In some embodiments, the lip 1032 may extend around the entire perimeter of the polymer substrate 1010, while in other embodiments the lip 1032 may be defined by spaced segments.

Figure 11:
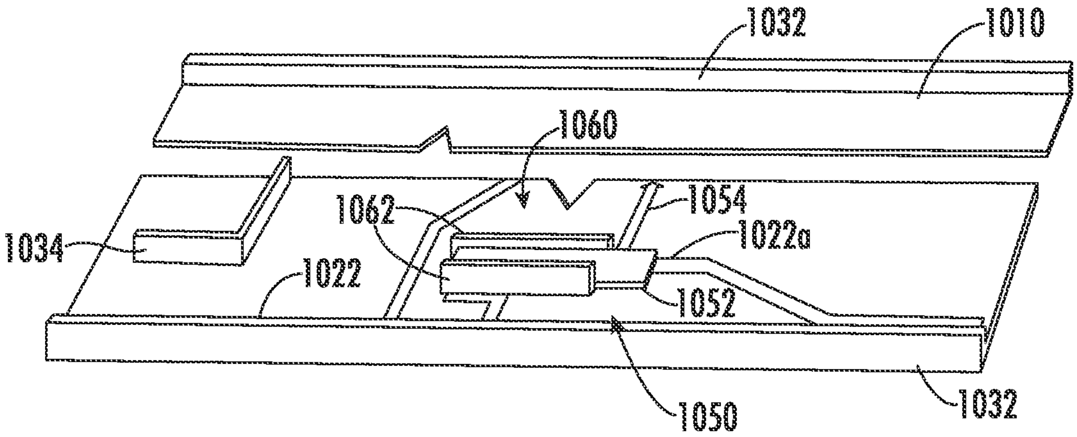
FIG. 11 is a perspective view of a portion of the antenna assembly of FIGS. 8 and 8A and phase shifter.
Figure 12:
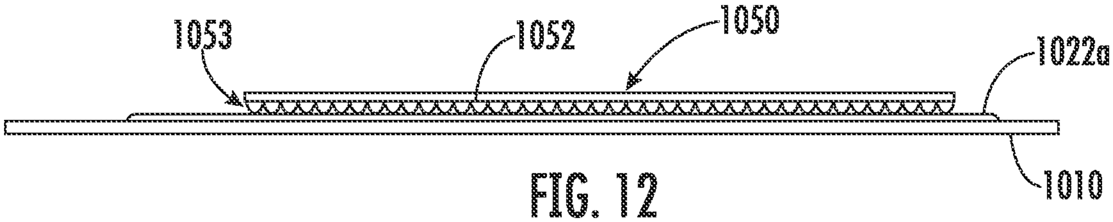
FIG. 12 is a side view of an embodiment of the phase shifter usable in the antenna assembly of FIGS. 8-9.

Other spacer features may also be provided as shown in FIGS. 8A and 11. The spacer feature comprises flanges 1034 that are positioned in the interior of, and extend rearwardly from, the polymer substrate 1010. The flanges 1034 engage the backplane 1006 to maintain the gap air 1030. The flanges 1034 may extend substantially perpendicularly from the polymer substrate 1010. In the embodiment of FIG. 8A, the spacers have a generally T-shape in plan view, however, the flanges 1034 may have any suitable shape and size. In one embodiment, the flanges 1034 extend from the polymer substrate 1010 the same distance as the lip 1032 such that the flanges 1034 and the lip 1032 cooperate to support the feed subassembly 1014 at a consistent distance in front of the backplane 1006 such that the air gap 1030 has a constant thickness over the entire extent of the backplane 1006 and the feed subassembly 1014. Because the polymer substrate 1010 may be molded of plastic, the spacer features 1032 and 1034 may be molded with the polymer substrate 1010 to create a one-piece, unitary structure. In addition to the molded spacer features 1032 and 1034, separate spacers may also be used, if desired. For example, separate posts may be provided between the polymer substrate 1010 and the backplane 1006 where the posts are fastened to the polymer substrate 1010 and the backplane 1006 by separate fasteners, adhesive or the like.

The device illustrated in FIGS. 8 and 9 is a 2 by 3 subarray. As configured, the device comprises a first input 1036 that feeds RF signals to the first feed line 1020 and a second input 1038 that feeds RF signals to the second feed line 1022. The array is divided into a first group 1040 of 3 radiating elements 1002 to a first side of the inputs 1036, 1038 and a second group 1042 of 3 radiating elements 1002 to a second side of the inputs 1036, 1038. The length of each RF transmission path from the inputs 1036, 1038 to the individual radiating elements will result in a respective fixed phase shift (for an RF signal having a given center frequency) that is applied to RF signals that are fed from the inputs 1036, 1038 to the respective radiating elements 1002. In addition to these fixed phase shifts, an additional adjustable phase shift may be applied to RF signals that are fed to one or more of the radiating elements 1002. In the illustrated embodiment, an adjustable phase shift may be applied to each of the radiating elements 1002 in the first group 1040 while no mechanism is provided for applying an adjustable phase shift to the radiating elements 1002 in the second group 1042. While the structure and operation of the phase shifters according to embodiments of the invention will be described with respect to the antenna assemblies described herein, it is to be understood that the phase shifters may be used with any configuration of an antenna assembly and that a greater or fewer number of radiating elements may be provided in the antenna assembly and that a greater or fewer number of the radiating elements of the antenna assembly may be provided with an adjustable phase shift. For example, FIG. 8A shows a three radiating element subarray where all of the radiating elements are provided with an adjustable phase shift. Moreover, multiple antenna assemblies may be provided in a single antenna as described above.

Figure 10:
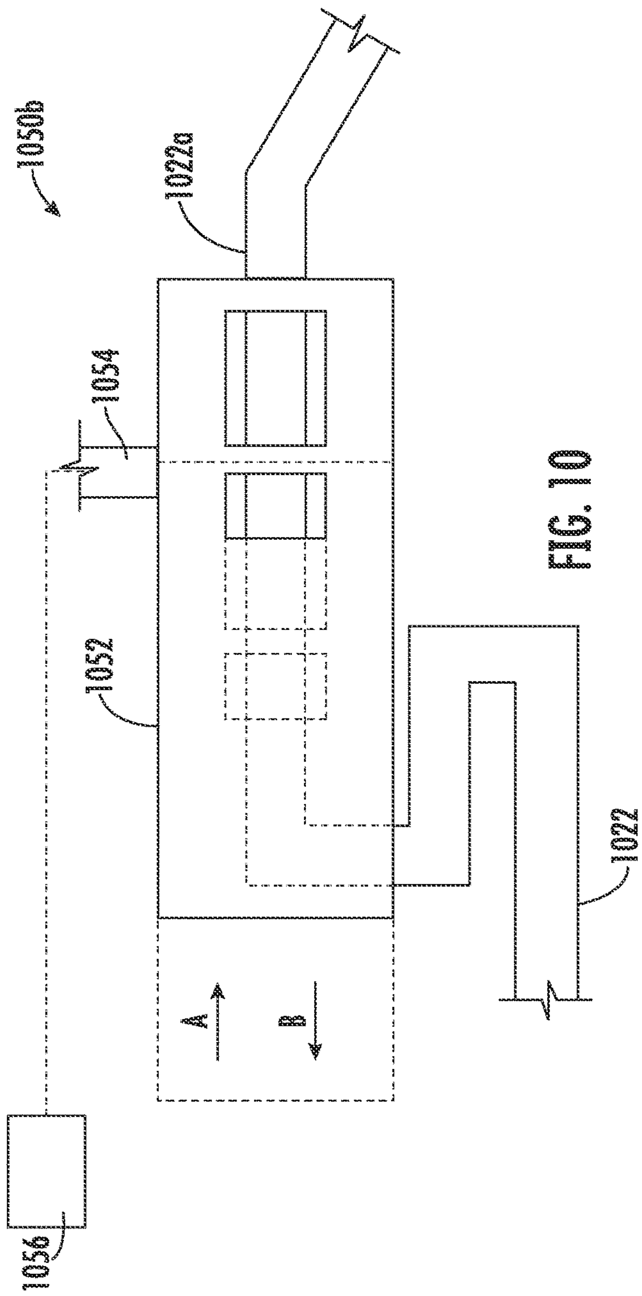
FIG. 10 is a plan view of an embodiment of a phase shifter usable in the antenna assembly of FIGS. 8-9.

In the illustrated embodiment, the phase shifters 1050 are disposed in the feed lines 1020, 1022 that pass RF signals to and from the first group 1040 of radiating elements 1002. Two phase shifters 1050*a*, 1050*b* are provided with one phase shifter 1050*a* associated with feed line 1020 and one phase shifter 1050*b* associated with the feed line 1022. The structure of the phase shifters 1050*a*, 1050*b* are substantially identical such that one phase shifter 1050 will be described in detail. Referring to FIG. 10, phase shifter 1050*b* comprises a movable element comprising a movable dielectric member 1052 disposed in the air gap 1030 between the feed subassembly 1014 and the backplane 1006. The dielectric member 1052 is positioned along a leg 1022*a* of the feed line 1022 such that it may be moved to selectively overlay a greater or lesser portion of the leg 1022*a*. As the dielectric member 1052 is moved to overlay a greater or lesser portion of the leg 1022*a* the amount that the phase of each RF signal traversing the feed line 1022 will change as is known in the art. This process also occurs in feed line 1020 using phase shifter 1050*a* to adjust the phase of the RF signals fed to the dipole radiators having the first polarization of the cross dipole radiating elements 1002 in the first group 1040 of radiating elements. In the illustrated embodiment, the leg 1022*a* is a linear section of feed line 1022 and the dielectric member 1052 moves linearly along the length of the leg 1022*a* to overlay the leg 1022*a* to a greater or lesser degree. As is shown in FIG. 10, as the dielectric member 1052 is moved in the direction of arrow A, a greater length of the leg 1022*a* is overlayed by the dielectric member 1052 with less of the dielectric member 1052 extending beyond the end of leg 1020*a*. When the dielectric member 1052 is moved in the direction of arrow B, a lesser length of the leg 1022*a* is overlayed by the dielectric member 1052 with more of the dielectric member 1052 extending beyond the end of leg 1022*a* (as shown in the dashed line position). As the length of leg 1022*a* that is overlayed by dielectric member 1052 is changed the phases of the sub-components of an RF signal that are fed to the radiating elements in the first group 1040 via feed line 1022 is shifted. The first phase shifter 1050*a* operates in the same manner as the second phase shifter 1050*b*.

The dielectric members 1052 in the phase shifters 1050 may be connected to a mechanical linkage 1054 that may be moved by a remote electronic actuator 1056 to change the position of the dielectric members 1052 relative to the legs 1020*a*, 1022*a* in feed lines 1020, 1022 and thereby adjust the phase shift of the sub-components of RF signals that are fed to the radiating elements 1002 in the first group 1040 of radiating elements. The dielectric members 1052 in both phase shifters 1050*a* and 1050*b* may be connected to the same mechanical linkage 1054 and RET actuator 1056 such that the phase shifters 1050*a*, 1050*b* of both feed lines a 1020, 1022 are adjusted simultaneously.

As shown in FIG. 8, the phase shifters 1050*a*, 1050*b* are positioned only in the feed lines 1020, 1022 that feed sub-components of an RF signal to the radiating elements 1002 in the first group 1040 of radiating elements such that the phase of the sub-components of the signals that are fed to radiating elements 1002 in the second group 1042 of radiating elements is not adjustable. If it was desired to make all of the radiating elements adjustable, the phase shifters 1050 could be located in the legs 1020*b*, 1022*b* directly after the inputs 1036, 1038 as shown in FIG. 8A, for example. Alternatively, a second pair of phase shifters 1050 may be positioned in the feed lines that lead to the radiating elements 1002 in the second group 1042 of radiating elements. The second pair of phase shifters 1050 may be adjusted by the same remote actuator 1056 as the first pair of phase shifters 1050*a*, 1050*b* such that all of the radiating elements 1002 are adjusted simultaneously. Alternatively, a second remote actuator 1056 may be connected to the second pair of phase shifters 1050 by a second mechanical linkage 1054 such that the radiating elements 1002 in the first group 1040 of radiating elements are separately adjustable from the radiating elements 1002 in the second group 1042 of radiating elements. The number and arrangement of the phase shifters 1050 and the remote actuators 1056 may be varied from that as specifically shown herein based on the space limitations of the antenna and the requirements of the system. The phase shifters 1050 may be located in the feed lines 1020, 1022 at any position between the inputs 1036, 1038 and the radiating elements 1002 to be adjusted to make various groups of radiating elements adjustable individually or in various combinations.

While a linearly moving dielectric member 1052 has been described, the dielectric member 1052 may be moved in a rotary manner. In such an embodiment, the legs 1020*a*, 1022*a* may be made with an arcuate shape and the dielectric member 1052 may be made with a matching arcuate shape where the dielectric member 1052 is selectively rotated or pivoted to overlay a greater or lesser portion of the arcuate feed line leg.

Movement of the dielectric members 1050 is facilitated by use of the polymer substrate 1010. It will be appreciated that movement of the dielectric members 1052 relative to the legs 1020*a*, 1022*a* of the feed lines 1020, 1022 must be carefully controlled to accurately control the phase shift applied to the sub-components of the RF signals that are fed to the radiating elements 1002. In one embodiment, guides 1060 may be formed with the polymer substrate 1010 to control the movement of the dielectric members 1052 relative to the feed lines 1020, 1022. As shown in FIG. 11, the guides 1060 may be formed in a unitary manner with the polymer substrate 1010. Each guide 1060 may comprise a pair of sidewalls 1062 that extend substantially perpendicularly from the polymer substrate 1010 toward the backplane 1006. The sidewalls 1062 parallel the legs 1020*a*, 1022*a* of feedlines 1020, 1022, respectively, with one sidewall 1062 positioned to either side of the feed line legs 1020*a*, 1022*a*. The sidewalls 1062 are spaced from one another a distance to closely but movably receive dielectric member 1052 therebetween. The dielectric member 1052 is thereby constrained to move between the sidewalls 1062 of guide 1060 such that the dielectric member 1052 is guided along the length of the legs 1020*a*, 1022*a*. Because the polymer substrate 1010 may be molded of plastic, the sidewalls 1062 of guide 1060 may be molded with the polymer substrate 1006 to create a one-piece, unitary structure. While one embodiment of a guide 1060 is shown, the guide 1060 may comprise different structures. For example, the guide 1060 may comprise a single guide member that extends from the polymer substrate 1010 that engages a slot formed in the dielectric member 1052. Where the legs 1020*a*, 1022*a* and the dielectric member 1052 are arcuate, the sidewalls 1062 and/or guide member may also have a corresponding arcuate shape.

In some embodiments, the surfaces of the dielectric members 1052 that contact the feed lines 1020 and 1022 may comprise a plurality of small bumps 1053 (FIG. 12) to decrease the surface area of the dielectric members 1052 that contacts the feed lines 1020, 1022 to thereby decrease the force of friction between these components as the dielectric members 1052 move relative thereto. Decreasing friction between the dielectric members 1052 and the feed lines 1020, 1022 allows less force to be used to move the dielectric members 1052 and facilitates precise adjustment of the dielectric members 1052 relative to the feed lines 1020, 1022.

Figure 13:
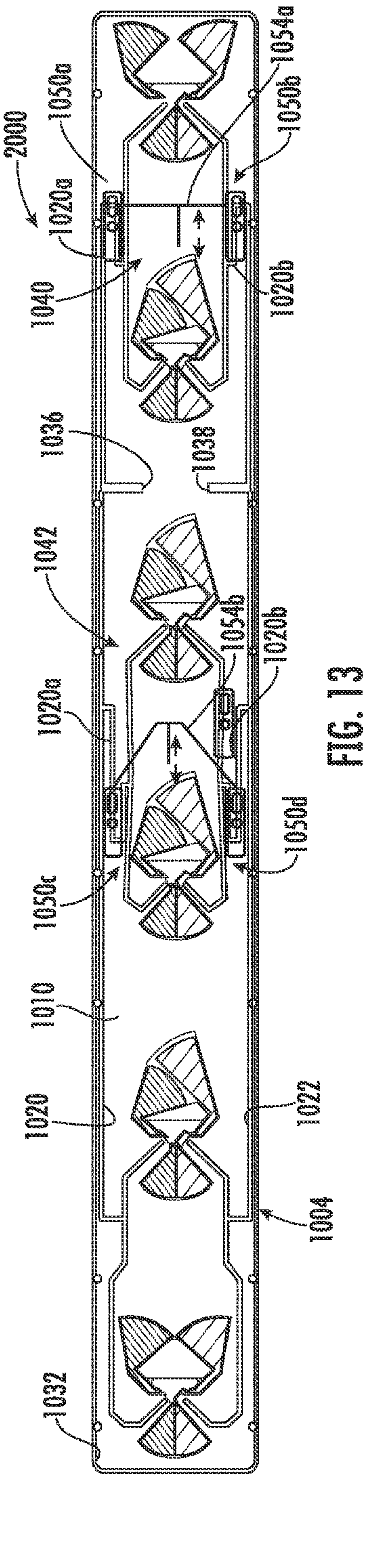
FIG. 13 is a rear view of another antenna assembly according to embodiments of the invention.
Figure 14:
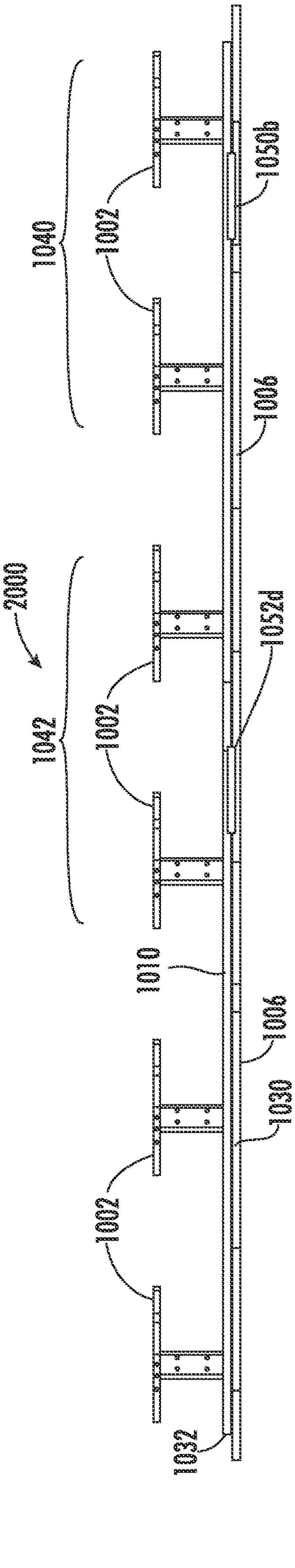
FIG. 14 is a side view of the antenna assembly of FIG. 13.

Referring to FIGS. 13 and 14, another embodiment of an antenna assembly 2000 is shown. The same reference numerals are used in FIGS. 13 and 14 to identify similar components previously described with reference to FIGS. 8 through 12. In antenna assembly 2000 two pairs of phase shifters 1050*a*, 1050*b* and 1050*c*, 1050*d* are used where each of the pairs of phase shifters adjusts the phase of the sub-components of an RF signal that are fed to two of the radiating elements 1002. The phase shifters 1050*a*, 1050*b* apply phase shifts to the sub-components of the RF signal that are fed to a first group 1040 of radiating elements 1002 and the phase shifters 1050*c*, 1050*d* apply phase shifts to the sub-components of the RF signal that are fed to a second group 1042 of radiating elements 1002. The phase shifters 1050*a*, 1050*b* may be operated independently from phase shifters 1050*c*, 1050*d* such that the phases of the sub-components of the RF signal that are fed to first group 1040 of radiating elements 1002 may be controlled independently of the phases of the sub-components of the RF signal that are fed to the second group 1042 of radiating elements 1002. A separate RET actuator 1056 may be connected to each of the pairs of phase shifters 1050*a*, 1050*b* and 1050*c*, 1050*d* by mechanical linkages 1054*a* and 1054*b*, respectively. Alternatively, a single multi-RET actuator may be connected to each of the pairs of phase shifters 1050*a*, 1050*b* and 1050*c*, 1050*d* by mechanical linkages 1054*a* and 1054*b*, respectively, where the multi-RET actuator controls the pairs of phase shifters 1050*a*, 1050*b* and 1050*c*, 1050*d* independently of one another. The two pairs of phase shifters 1050*a*, 1050*b* and 1050*c*, 1050*d* may also be controlled together by either a single RET actuator or by separate RET actuators.

The specific configurations of the phase shifters, radiating elements and mounting structures described herein may vary from that as specifically shown herein. For example, arrays of radiating elements other than as specifically shown and described may be provided. Moreover, the phase shifters described herein may be used to control the radiating elements in groups or individually other than as shown.

Figure 15:
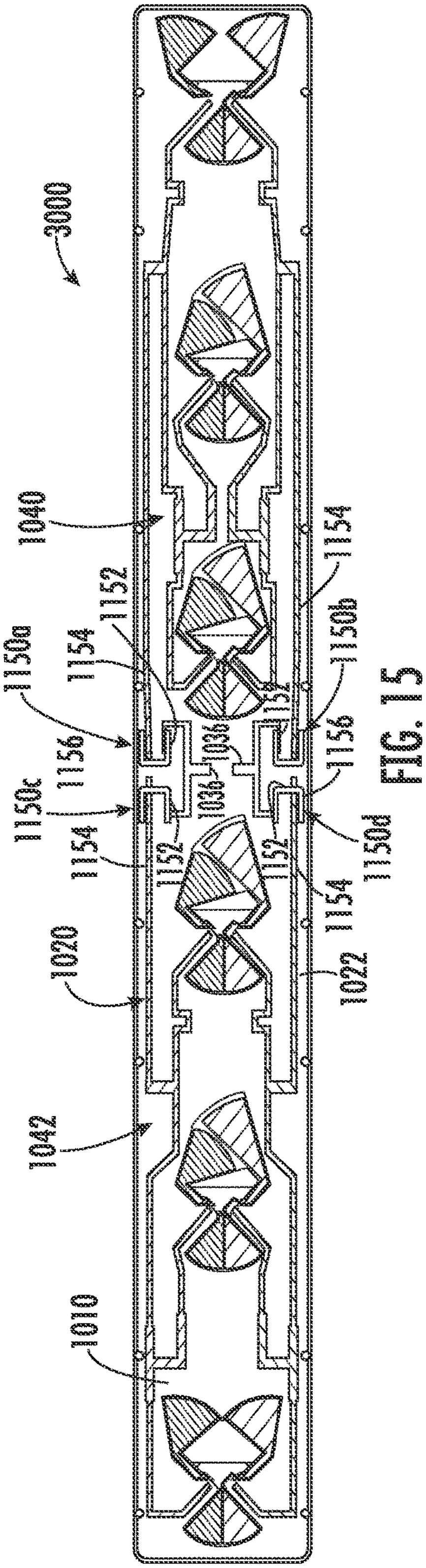
FIG. 15 is a rear view of an antenna assembly according to other embodiments of the invention.
Figure 16:
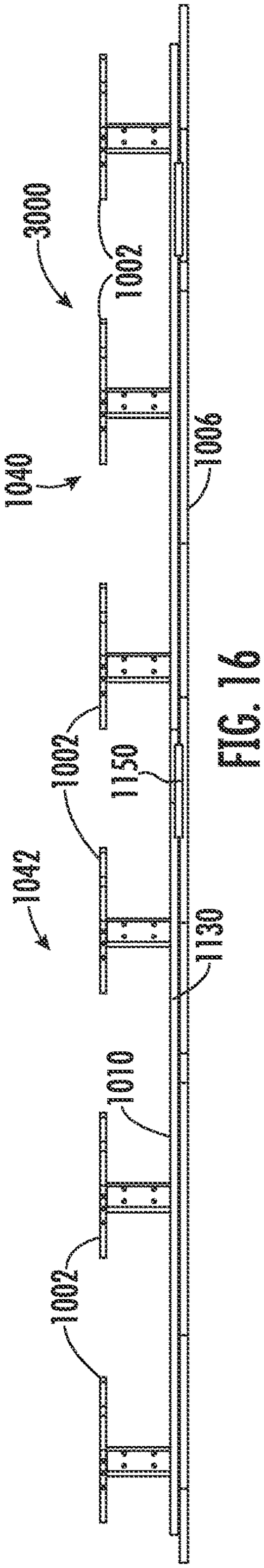
FIG. 16 is a side view of the antenna assembly of FIG. 15.
Figure 17:
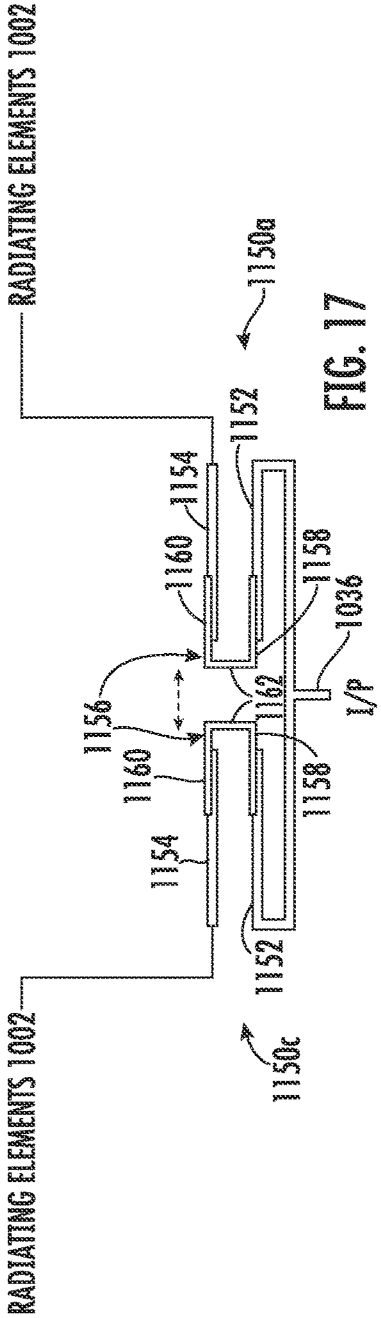
FIG. 17 is a schematic view of the phase shifter used in the antenna assembly of FIGS. 15 and 16.
Figure 18:
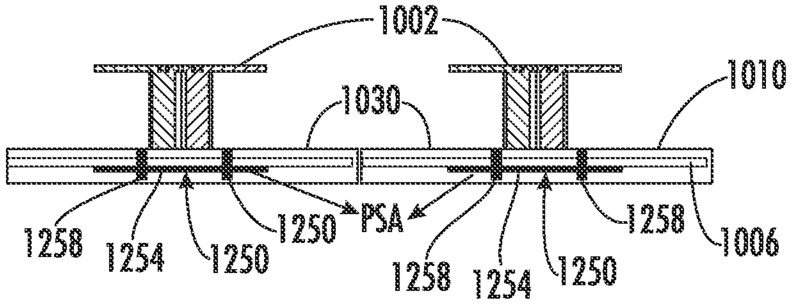
FIG. 18 is a partial side view of an antenna assembly according to other embodiments of the invention.

Another embodiment of a phase shifter is shown in FIGS. 15, 16 and 17. The same reference numerals are used in FIGS. 15 through 17 to identify similar components previously described with reference to FIGS. 8 through 12. In this embodiment, an antenna assembly 3000 is shown in which embedded trombone phase shifters 1150 are used. In the embodiment of FIGS. 15 through 17, two feed lines are provided where the first feed line 1020 feeds dipole radiators having a first polarization of the cross dipole radiating elements 1002 and the second feed line 1022 feeds dipole radiators having a second polarization of the cross dipole radiating elements 1002. The specific configurations of the first feed line 1020 and the second feed line 1022 are for illustrative purposes only and the actual configurations of the first and second feed lines 1020, 1022 may be different than as specifically shown herein. In the embodiment illustrated in FIGS. 15 and 16, four trombone phase shifters 1150*a*, 1150*b*, 1150*c* and 1150*d* are used with each trombone phase shifter 1150 being positioned between one of the inputs 1036, 1038 and three of the six radiating elements 1002. The six radiating elements 1002 are divided into two groups 1040, 1042 of three radiating elements each. Phase shifters 1150*a* and 1150*b* are positioned along the feed lines for the first group 1040 of phase shifters 1002 and phase shifters 1150*c* and 1150*d* are positioned along the feed lines for the second group 1042 of phase shifters 1002. In this embodiment, an adjustable phase shift may be applied to the sub-components of an RF signal that are fed to all of the radiating elements 1002. However, as explained previously, the arrangement of the phase shifters 1150 and radiating elements 1002 may be different than as specifically shown herein where phase shifters 1150 may be used to control individual or groups of radiating elements other than as specifically shown. Moreover, the antenna assemblies using the phase shifters as described herein may include a greater or fewer number of radiating elements.

Each embedded trombone phase shifter 1150 comprises an input leg 1152 in the feed line that is connected to one of the feed inputs 1036, 1038. In the illustrated embodiment, four input legs 1152 are provided with two input legs 1152 extending from the first input 1036 and two input legs 1152 extending from the second input 1038. Each trombone phase shifter 1150 also includes an output leg 1154 that is connected to the feed line leading to each of the radiating elements 1002 that is to be provided with an adjustable phase shift by that trombone phase shifter 1150. In the illustrated embodiment, each output leg 1154 is connected to the feed line for three of the radiating elements 1002 such that each trombone phase shifter 1150 adjusts the phase for the dipole radiators having one polarization of three radiating elements 1002. Each phase shifter 1150 further comprises a movable element comprising a movable trombone member 1156 that connects the input leg 1152 to the output leg 1154. The movable trombone members 1156 are located in the air gap 1030 and overlay the conductive traces that define the input leg 1152 and output leg 1154. In the illustrated embodiment, each movable trombone member 1156 is a substantially U-shaped electrically conductive element having a first stem 1158 electrically coupled to the input leg 1152 and a second stem 1160 electrically coupled to the output leg 1154. The first stem 1158 and the second stem 1160 are connected by a transverse member 1162 such that the RF signal may be transmitted from the input leg 1152 to the output leg 1154 through the first stem 1158, the second stem 1160 and the transverse member 1162.

A RET actuator 1056 may be connected to the movable trombone members 1156 of each pair 1150*a*, 1150*b* and 1150*c*, 1150*d* phase shifters by mechanical linkages 1054 as shown in FIGS. 8 and 10. Alternatively, a single multi-RET actuator may be connected to the pairs of phase shifters 1150*a*, 11150*b* and 1150*c*, 1150*d*, respectively, where the multi-RET actuator controls more than one pair of phase shifters. The RET actuator(s) 1056 may control one pair of phase shifters 1150*a*, 1150*b* independently from the other pair of phase shifters 1050*c*, 1150*d* or the pairs of phase shifters may be controlled together.

As the movable trombone member 1156 is moved relative to the input leg 1152 and the output leg 1154 the length of the feed line to the radiating elements 1002 is either increased or decreased to thereby adjust the sub-components of an RF signal that are fed to the respective radiating elements 1002 connected to that feed line. For example, referring to FIG. 17 as the movable trombone member 1156 of trombone phase shifter 1150*a* is extended (moved to the left in FIG. 17) the length of feed line is increased and as the movable trombone member 1156 of trombone phase shifter 1150*a* is retracted (moved to the right in FIG. 17) the length of feed line is decreased. The change in the length of the feed line is created by overlaying more or less of the first stem 1158 and the second stem 1160 on the input leg 1152 and the output leg 1154, respectively.

Figure 19:
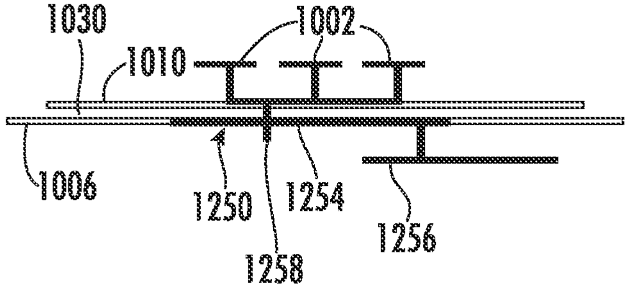
FIG. 19 is a schematic side view of the antenna assembly of FIG. 18.

The movable trombone member 1156 may be guided by guides 1060, as previously described, formed with the polymer substrate 1010 to control the movement of the movable trombone member 1156 relative to the input stem 1152 and output stem 1154. As previously described, the guides 1060 may be formed in a unitary manner with the polymer substrate 1010. Each guide 1060 may comprise a pair of sidewalls 1062 that extend from the polymer substrate 1010 toward the backplane 1006. The sidewalls 1062 are spaced from one another a distance to slidably receive the movable trombone member 1156 therebetween. The movable trombone member 1156 is thereby constrained for movement between the sidewalls 1062 such that the movable trombone member 1156 moves along the length of the input stem 1152 and output stem 1154. Because the polymer substrate 1010 may be molded of plastic, the guide 1060 may be molded with the polymer substrate 1006 to create a one-piece, unitary structure. Another embodiment of a phase shifter is shown in FIGS. 18 through 21. The same reference numerals are used in FIGS. 18 through 21 to identify similar components previously described with reference to FIGS. 8 and 9. The phase shifter assemblies 1250 are located on the back side of the back plane 1006 rather than in the air gap 1030 as was the case in the previous embodiments. The phase shifter assembly (PSA) 1250 is located on the back side of the back plane 1006 where the "backside" of the back plane 1006 is the side of the back plane 1006 opposite to the radiating elements 1002. The PCB 1254 of the phase shifter assembly 1250 may be embedded with the calibration board 1256 or it may be a separate PCB electrically coupled to the calibration board 1256 as shown in FIG. 19.

The PSA 1250 may comprise phase shifter 1252 comprising any suitable phase shifter such as a rotational or linear phase shifter or a trombone style phase shifter, as described above, mounted on a PCB 1254. One widely-used type of phase shifter is an electromechanical "wiper" phase shifter that includes a main printed circuit board and a "wiper" printed circuit board that may be rotated above the main printed circuit board. Such wiper phase shifters typically divide an input RF signal that is received at the main printed circuit board into a plurality of sub-components, and then capacitively couple at least some of these sub-components to the wiper printed circuit board. The sub-components of the RF signal may be capacitively coupled from the wiper printed circuit board back to the main printed circuit board along a plurality of arc-shaped traces, where each arc has a different diameter. Each end of each arc-shaped trace may be connected to a radiating element or to a sub-group of radiating elements. By physically (mechanically) rotating the wiper printed circuit board above the main printed circuit board, the locations where the sub-components of the RF signal capacitively couple back to the main printed circuit board may be changed, which thus changes the length of the respective transmission path from the phase shifter to an associated radiating element for each sub-component of the RF signal. The changes in these path lengths result in changes in the phases of the respective sub-components of the RF signal, and since the arcs have different radii, the phase changes along the different paths will be different. Thus, the above-described wiper phase shifters may be used to apply a phase taper to the sub-components of an RF signal that are applied to each radiating element (or sub-group of radiating elements). Exemplary phase shifters of this variety are discussed in U.S. Pat. No. 7,907,096 to Timofeev, the disclosure of which is hereby incorporated by reference herein in its entirety. The wiper printed circuit board is typically moved using an electromechanical actuator that is connected to the wiper printed circuit board via a mechanical linkage.

Figure 20:
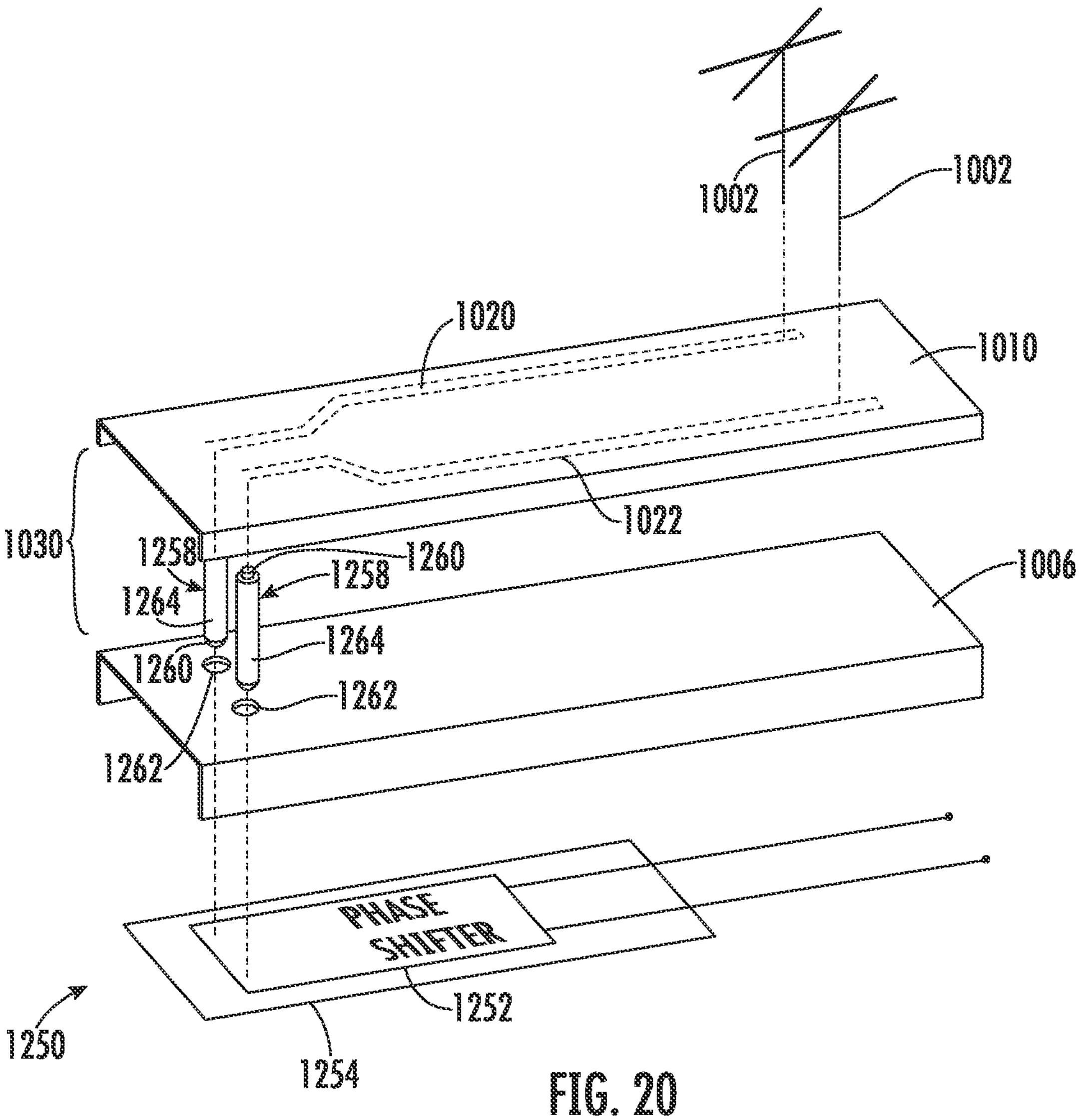
FIG. 20 is an exploded perspective view of the antenna assembly of FIGS. 18 and 19.
Figure 21:
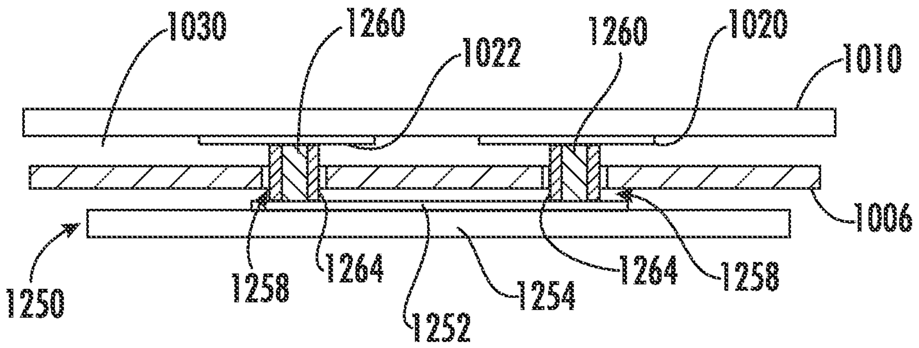
FIG. 21 is a partial section view of the antenna assembly of FIGS. 18-20.

The RF connection between the PCB 1254 of a PSA 1250 and the radiating element(s) 1002 controlled by that PSA 1250 is made by a pin connection 1258 between the output ports of the PSA 1250 and the input to the feed lines for the radiating element(s) 1002 controlled by that PSA 1250. In FIG. 19, the PSA 1250 is connected to three radiating elements by pin connection 1258 where the PCB 1254 of PSA 1250 is shown as a separate board from the calibration board 1256. The pin connection 1258 may comprise an electrical connector such as a rod 1260 made of an electrically conductive material such as copper that extends through an aperture 1262 in the back plane 1006 and is soldered to the output of PSA 1250 and to the feed line to the radiating elements 1002 controlled by that PSA 1250. The rod 1260 may be covered in an electrically insulating sheath 1264 to electrically isolate the rod 1260. The sheath 1264 may be formed separately from the polymer substrate 1010, as shown in FIG. 20, such that the rod 1260 with the insulating sheath 1264 form a separate component from the polymer substrate 1010. However, in one embodiment, the electrically insulating sheath 1264 may be formed integrally with the polymer substrate 1010 and the rod 1260 may be inserted through the integrally formed sheath 1264, as shown in FIG. 21. For example, the sheath may be molded as a single unitary piece with the polymer substrate 1010. A board-to-board connector may also be used to make the connection between the output of the PSA 1250 and the feed lines to the radiating elements 1002.

In some embodiments, the calibration board 1256 may extend the entire width of the antenna such that at least one PSA 1250 may be provided on the calibration board 1256 for each column of radiating elements 1002. Alternatively, a separate PCB 1254 may be provided that extends the entire width of the antenna such that at least one PSA 1250 may be provided on the PCB for each column of radiating elements 1002. Each phase PSA 1250 may control the phase of one or more radiating or groups of radiating elements as previously described.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An antenna assembly comprising;

a backplane;

a polymer substrate mounted over the backplane to define an air gap between a rear surface of the polymer substrate and the backplane, wherein a front surface of the polymer substrate supports a plurality of radiating elements, each of the plurality of radiating elements comprising a polymer-based waveguide feed stalk and a polymer-based pair of radiating arms supported by and electrically coupled to said waveguide feed stalk;

a conductive layer formed on the rear surface of the polymer substrate such that the conductive layer faces the backplane, wherein the conductive layer comprises a first feed line that connects to first polarization radiators of the plurality of radiating elements and a second feed line that connects to second polarization radiators of the plurality of radiating elements; and a phase shifter positioned in the air gap that is configured to adjust the phase of at least a first sub-component of an RF signal that is passed to a first of the radiating elements.

2. The antenna assembly of claim 1 wherein the phase shifter comprises a dielectric member disposed in the air gap.

3. The antenna assembly of claim 2 wherein the dielectric member is positioned along the first feed line such that the dielectric member is movable to selectively overlay a greater or lesser portion of the first feed line.

4. The antenna assembly of claim 3 wherein the dielectric member is positioned along a linear leg of the first feed line and moves linearly along the length of the leg to overlay the leg to a greater or lesser degree.

5. The antenna assembly of claim 3 wherein the dielectric member is positioned along an arcuate leg of the first feed line and moves rotationally along the length of the leg to overlay the leg to a greater or lesser degree.

6. The antenna assembly of claim 3 wherein the dielectric member is connected to a mechanical linkage that is moved by a remote electronic actuator to change the position of the dielectric member relative to the first feed line.

7. The antenna assembly of claim 1 wherein the waveguide feed stalk is a grounded coplanar waveguide (GCPW) feed stalk.

8. The antenna assembly of claim 7 wherein the polymer-based pair of radiating arms is electrically coupled to a feed conductor on the GCPW feed stalk and a second polymer-based pair of radiating arms is electrically coupled to a metallized ground plane on the GCPW feed stalk.

9. The antenna assembly of claim 8 wherein the GCPW feed stalk comprises a plurality of plated through-holes therein; and wherein the first and second portions of the metallized ground plane on the first side of the GCPW feed stalk are electrically coupled by the plurality of plated through-holes to a third portion of the metallized ground plane on the second side of the GCPW feed stalk.

10. The antenna assembly of claim 1 further comprising first and second coplanar waveguide feed stalks, and wherein the polymer-based pair of radiating arms are configured as a quad-arrangement of double-sided metallized radiating elements, which share a common unitary polymer substrate with said first and second coplanar waveguide feed stalks.

11. The antenna assembly of claim 10 wherein the first feed line and the first of a first pair of radiating arms are collectively configured as an uninterrupted layer of metallization that extends between the first feed line and a forward-facing surface of the first of the first pair of radiating arms; and wherein the second feed line and the first of a second pair of radiating arms are collectively configured as an uninterrupted layer of metallization that extends between the second feed line and a rear-facing surface of the first of the second pair of radiating arms.

12. An antenna assembly comprising;

a backplane having a front side and a rear side;

a polymer substrate mounted over the backplane to define an air gap between a rear surface of the polymer substrate and the front side of the backplane, wherein a front surface of the polymer substrate supports a plurality of radiating elements, each of the plurality of radiating elements comprising a polymer-based waveguide feed stalk and a polymer-based pair of radiating arms supported by and electrically coupled to said waveguide feed stalk;

a conductive layer formed on the rear surface of the polymer substrate such that the conductive layer faces the front side of the backplane, wherein the conductive layer comprises a first feed line that connects to first polarization radiators of the plurality of radiating elements and a second feed line that connects to second polarization radiators of the plurality of radiating elements; and a phase shifter assembly positioned to the back side of the back plane for adjusting the phase of at least a first sub-component of an RF signal that is passed to a first of the radiating elements of the plurality of radiating elements.

13. The antenna assembly of claim 12 wherein the phase shifter assembly comprises a phase shifter PCB supporting a phase shifter.

14. The antenna assembly of claim 13 wherein the phase shifter PCB is embedded with a calibration board.

15. The antenna assembly of claim 13 wherein the phase shifter PCB is a separate PCB from a calibration board and is electrically coupled to the calibration board.

16. An antenna assembly comprising;

a backplane;

a polymer substrate mounted over the backplane to define an air gap between a rear surface of the polymer substrate and the backplane, wherein a front surface of the polymer substrate supports a plurality of radiating elements;

a conductive layer formed on the rear surface of the polymer substrate such that the conductive layer faces the backplane, wherein the conductive layer comprises a first feed line that connects to first polarization radiators of the plurality of radiating elements and a second feed line that connects to second polarization radiators of the plurality of radiating elements; and a phase shifter positioned in the air gap;

a spacer feature formed as one-piece with the polymer substrate, the spacer feature maintaining the distance between the polymer substrate and the backplane.

17. The antenna assembly of claim 16 wherein the spacer feature comprises a lip that extends from adjacent a perimeter of the polymer substrate, wherein the lip engages the backplane.

18. The antenna assembly of claim 17 wherein the spacer feature comprises a flange that extends from the polymer substrate and engages the backplane.

19. The antenna assembly of claim 18 wherein the lip and the flange extend from the polymer substrate the same distance.

20. The antenna assembly of claim 16 wherein the spacer feature is molded with the polymer substrate.

* * * * *